United States Patent
Cheng et al.

(10) Patent No.: US 11,846,033 B2
(45) Date of Patent: Dec. 19, 2023

(54) ELECTROCHEMICAL PRODUCTION OF AMMONIA AND CATALYST THEREFOR

(71) Applicants: Yingwen Cheng, Sycamore, IL (US); Ke Lu, DeKalb, IL (US)

(72) Inventors: Yingwen Cheng, Sycamore, IL (US); Ke Lu, DeKalb, IL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 203 days.

(21) Appl. No.: 17/323,185

(22) Filed: May 18, 2021

(65) Prior Publication Data

US 2022/0372641 A1 Nov. 24, 2022

(51) Int. Cl.

| | |
|---|---|
| *C25B 11/075* | (2021.01) |
| *C25B 1/27* | (2021.01) |
| *C25B 9/19* | (2021.01) |
| *C25B 11/052* | (2021.01) |
| *C25B 1/50* | (2021.01) |
| *C01G 39/06* | (2006.01) |
| *C25B 11/065* | (2021.01) |

(52) U.S. Cl.
CPC ............ *C25B 11/075* (2021.01); *C01G 39/06* (2013.01); *C25B 1/27* (2021.01); *C25B 1/50* (2021.01); *C25B 9/19* (2021.01); *C25B 11/052* (2021.01); *C25B 11/065* (2021.01)

(58) Field of Classification Search
CPC ....... C25B 1/27; B01J 27/0515; C01G 39/006
See application file for complete search history.

(56) References Cited

U.S. PATENT DOCUMENTS

| | | | | |
|---|---|---|---|---|
| 4,560,470 A | * | 12/1985 | McCarty | ............ B01J 27/0515 502/220 |
| 4,966,749 A | * | 10/1990 | Kondo | ............ H10N 60/0212 419/57 |
| 5,041,347 A | | 8/1991 | Dahn et al. | |
| 2005/0220699 A1 | | 10/2005 | Gofer et al. | |
| 2019/0382903 A1 | * | 12/2019 | Johanning | ............ C25B 9/70 |

FOREIGN PATENT DOCUMENTS

| | | | | |
|---|---|---|---|---|
| CN | 111701598 A | * | 9/2020 | |
| JP | H04-345758 | | 12/1992 | |
| JP | H04-345758 A | * | 12/1992 | ............ Y02E 60/10 |

(Continued)

OTHER PUBLICATIONS

Wang et al, "FeMo3S4 for Efficient Nitrogen Reduction Reaction", ACS Sustainable Chemistry & Engineering, vol. 8 (Aug. 18, 2020), p. 12733-12740 and associated online Supporting Information (Year: 2020).*

(Continued)

*Primary Examiner* — Luan V Van
*Assistant Examiner* — Andrew Koltonow
(74) *Attorney, Agent, or Firm* — EVAN LAW GROUP LLC

(57) ABSTRACT

An iron-containing Chevrel phase material, contains iron and $Mo_6S_8$ clusters, in particular an iron-containing Chevrel phase material having a formula $Fe_xMo_6S_8$, wherein $2 \leq x \leq 4$. The iron-containing Chevrel phase provides an efficient catalyst for the electrochemical production of ammonia from water and nitrogen gas.

13 Claims, 18 Drawing Sheets

(56) References Cited

FOREIGN PATENT DOCUMENTS

| | | |
|---|---|---|
| JP | H04-363117 | 12/1992 |
| KR | 101984408 | 5/2019 |
| WO | 2020/016709 | 1/2020 |

OTHER PUBLICATIONS

Machine translation of JP-H04-345758 A to English, retrieved Feb. 28, 2023 via ESpaceNet. (Year: 1992).*
Erisman, J.W. et al., "How a century of ammonia synthesis changed the world", Nature Geoscience, vol. 1, No. 10, pp. 636-639, (2008).
Guo, J. et al., "Catalyst: $NH_3$ as an energy carrier", Chem. vol. 3, No. 5, pp. 709-712, (2017).
Wang, L. et al., "Greening ammonia toward the solar ammonia refinery", Joule, vol. 2, No. 6, pp. 1055-1074, (2018).
Kandemir, T. et al., "The haber-bosch process revisited: On the real structure and stability of "ammonia iron" under working conditions", Angewandte Chemie International Edition, vol. 52, No. 48, pp. 12723-12726, (2013).
Soloveichik, G., "Electrochemical synthesis of ammonia as a potential alternative to the haber-bosch process", Nature Catalysis, vol. 2, No. 5, pp. 377-380, (2019).
Smith, C. et al., "Current and future role of haber-bosch ammonia in a carbon-free energy landscape", Energy & Enviornmental Science, vol. 13, No. 2, pp. 331-344, (2020).
Zheng, J. et al., "Photoelectrochemical synthesis of ammonia on the aerophilic-hydrophilic heterostructure with 37.8% efficiency", Chem, vol. 5, No. 3, pp. 617-633, (2019).
Lazouski, N. et al., "Understanding continuous lithium-mediated electrochemical nitrogen reduction", Joule, vol. 3, No. 4, pp. 1127-1139, (2019).
Foster, S.L. et al., "Catalysis for nitrogen reduction to ammonia", Nature Catalysis, vol. 1, No. 7, pp. 490-500, (2018).
Rosca, V. et al., "Nitrogen cycle electrocatalysis", Chemical Reviews, vol. 109, No. 6, pp. 2209-2244, (2009).
Hu, L. et al., "Understanding the electrocatalytic interface for ambient ammonia synthesis", ACS Energy Letters, vol. 5, No. 2, pp. 430-436, (2020).
Singh, A.R. et al., "Strategies toward selective electrochemical ammonia synthesis," ACS Catalysis, vol. 9, No. 9, pp. 8316-8324, (2019).
Hawtof, R. et al., Catalyst-free, highly selective synthesis of ammonia from nitrogen and water by a plasma electrolytic system, Science Advances, vol. 5, No. 1, eaat5778, pp. 1-9, (2019).
Hu, L. et al., "Ambient electrochemical ammonia synthesis with high selectivity on Fe/Fe oxide catalyst", ACS Catalysis, vol. 8, No. 10, pp. 9312-9319, (2018).
Wang, J. et al., "Ambient ammonia synthesis via palladium-catalyzed electrohydrogenation of dinitrogen at low overpotential", Nature Communications, vol. 9, No. 1, 1795, pp. 1-7, (2018).
Li, L. et al., "Two-dimensional mosaic bismuth nanosheets for highly selective ambient electrocatalytic nitrogen reduction", ACS Catalysis, vol. 9, No. 4, pp. 2902-2908, (2019).
Patil, S.B. et al., "Enhanced $N_2$ affinity of $1T-MoS_2$ with a unique pseudo-six-membered ring consisting of N—Li—S—Mo—S—Mo for high ambient ammonia electrosynthesis performance", Journal of Materials Chemistry A, vol. 9, pp. 1230-1239, (2021).
Tao, H. et al., "Nitrogen fixation by Ru single-atom electrocatalytic reduction", Chem, vol. 5, No. 1, pp. 204-214 (2019).
Pang, F. et al., "Bimodal nanoporous $Pd_3Cu_1$ alloy with restrained hydrogen evolution for stable and high yield electrochemical nitrogen reduction", Nano Energy, vol. 58, pp. 834-841, (2019).
Han, L. et al., "Atomically dispersed molybdenum catalysts for efficient ambient nitrogen fixation", Angewandte Chemmie International Edition, vol. 58, No. 8, pp. 2321-2325, (2019).
Deng, J. et al., "Electrocatalytic nitrogen reduction at low temperature", Joule, vol. 2, No. 5, pp. 846-856, (2018).
Zhang, L. et al., "Electrochemical ammonia synthesis via nitrogen reduction reaction on a $MoS_2$ catalyst: Theoretical and experimental studies", Advanced Material, vol. 30, No. 28, 1800191, pp. 1-6, (2018).
Cheng, H. et al., "Molybdenum carbide nanodots enable efficient electrocatalytic nitrogen fixation under ambient conditions", Advanced Materials, vol. 30, No. 46, 1803694, pp. 1-7, (2018).
Chen, G.F. et al., "Ammonia electrosynthesis with high selectivity under ambient conditions via a $Li^+$ incorporation strategy", Journal of the American Chemical Society, vol. 139, No. 29, pp. 9771-9774, (2017).
Bao, D. et al., "Electrochemical reduction of $N_2$ under ambient conditions for artificial $N_2$ fixation and renewable energy storage using $N_2$/$NH_3$ cycle", Advanced Materials, vol. 29, No. 3, 1604799, pp. 1-5, (2017).
Singh, A.R. et al., "Electrochemical ammonia synthesis—The selectivity challenge" ACS Catalysis, vol. 7, No. 1, pp. 706-709, (2017).
Lu, K. et al., "LixNiO/Ni heterostructure with strong basic lattice oxygen anables electrocatalytic hydrogen evolution with Pt-like activity", Journal of the American Chemical Society, vol. 142, No. 29, pp. 12613-12619, (2020).
Suryanto, B.H.R. et al., "$MoS_2$ polymorphic engineering enhances selectivity in the electrochemical reduction of nitrogen to ammonia", ACS Energy Letters, vol. 4, No. 2, pp. 430-435, (2019).
Burgess, B.K. et al., "Mechanism of molybdenum nitrogenase", Chemical Reviews, vol. 96, No. 7, pp. 2983-3011, (1996).
Buscagan, T.M. et al., "Rethinking the nitrogenase mechanism: activating the active site", Joule, vol. 3, No. 11, pp. 2662-2678, (2019).
Banerjee, A. et al., "Photochemical nitrogen conversion to ammonia in ambient conditions with FeMoS-chalcogels", Journal of the American Chemical Society, vol. 137, No. 5, pp. 2030-2034, (2015).
Mao, M. et al., "Iodine, vapor transport-triggered preferential growth of chevrel $Mo_6S_8$ nanosheets for advanced multivalent batteries", ACS Nano, vol. 14, No. 1, pp. 1102-1110, (2020).
Levi, E. et al., "Crystallography of chevrel phases, $MMo_6T_8$ (M=Cd, Na, Mn, and Zn, T=S, Se) and their cation mobility", Inorganic Chemistry, vol. 48, No. 18, pp. 8751-8758, (2009).
Liu, M. et al., "A physical model for understanding the activation of $MoS_2$ basal-plane sulfur atoms for the hydrogen evolution reaction", Angewandte Chemie International Edition, vol. 59, No. 35, pp. 14835-14841, (2020).
Lu, K. et al., "Regulating interfacial na-ion flux via artificial layers with fast ionic conductivity for stable and high-rate na metal batteries", ACS Materials Letters, vol. 1, No. 3, pp. 303-309, (2019).
Sheng, H. et al., "Electrocatalytic production of $H_2O_2$ by selective oxygen reduction using earth-abundent cobalt pyrite ($CoS_2$)" ACS Catalysis, vol. 9, No. 9, pp. 8433-8442, (2019).
Zhang, H.T. et al., "$Mo_6S_8$-based single-metal-atom catalysts for direct methane to methanol conversion", The Journal of Chemical Physics, vol. 151, No. 2, pp. 024304-1-024304-12, (2019).
Bolleter, W.T. et al., "Spectrophotometric determination of ammonia as indophenol", Analytical Chemistry, vol. 33, pp. 592-594, (1961).
Zhao, S. et al., "Carbon-based metal-free catalysts for electrocatalytic reduction of nitrogen for synthesis of ammonia at ambient conditions", Advanced Material, vol. 31, No. 13, pp. 1805367-1-1805367-9. (2019).
Andersen, S.Z. et al., "A rigorous electrochemical ammonia synthesis protocol with quantitative isotope measurements", Nature, vol. 570, No. 7762, pp. 504-508, (2019).
Hu, B. et al., "Electrochemical dinitrogen reduction to ammonia by $Mo_2N$: Catalysis or decomposition?" ACS Energy Letters, vol. 4, No. 5, pp. 1053-1054, (2019).
Watt, G.W. et al., "A spectrophotometric method for determination of hydrazine", Analytical Chemistry, vol. 24, No. 12, pp. 2006-2008, (1952).
Liu, C. et al., "Mechanistic study of methanol synthesis from $CO_2$ and $H_2$ on a modified model $Mo_6S_8$ cluster", ACS Catalysis, vol. 5, No. 2, pp. 1004-1012, (2015).

(56) References Cited

OTHER PUBLICATIONS

Holmgren, D.J. et al., "Raman study of phonons in Chevrel-phase crystals", Physical Review B, vol. 36, No. 4, pp. 1952-1955, (1987).
Gallenkamp, C. et al., "Calibration of computational Mössbauer spectroscopy to unravel active sites in FeNC catalysts for the oxygen reduction reaction", International Journal of Quantum Chemistry, vol. 121, No. 3, e26394, pp. 1-19, (2020).
Marcus, H.L. et al., "Mossbauer spectra of FeMo alloys", Physical Review, vol. 162, No. 2, pp. 259-262. (1967).
Lu, K. et al., "A fast and stable Li metal anode incorporating an Mo6S8 artificial interphase with super Li-ion conductivity", Journal of Materials Chemistry A, vol. 7, No. 11, pp. 6038-6044, (2019).
Xie, A. et al., "Electrocatalytic hydrogen evolution in neutral pH soultions: dual-phase synergy", Catalysis, vol. 9, No. 9, pp. 8712-8718, (2019).
Song, Y. et al., "High-selectivity electrochemical conversion of $CO_2$ to ethanol using a copper nanoparticle/n-doped graphene electrode", ChemistrySelect, vol. 1, No. 19, pp. 6055-6061, (2016).
Zhu, D. et al., "Photo-illuminated diamond as a solid-state source of solvated electrons in water for nitrogen reduction", Nature Materials, vol. 12, No. 9, pp. 836-841, (2013).
Wang, M. et al., "Over 56.55% faradaic efficiency of ambient ammonia synthesis enabled by positively shifting the reaction potential", Nature Communications, vol. 10, No. 1, 341, pp. 1-8, (2019).
Duan, G. et al., "Advances in electrocatalytic ammonia synthesis under mild conditions", Progress in Energy and Combustion Science, vol. 81, pp. 100860-1-100860-30, (2020).
Leng, Y. et al., "Solid-state water electrolysis with an alkaline membrane", Journal of the American Chemical Society, vol. 134, No. 22, pp. 9054-9057, (2012).
Pena, O., "Chevrel phases: Past, present, and future", Physica C: Superconductivity, vol. 514, pp. 95-112, (2015).
Fujimori, A. et al., "Photoemission auger-electron spectroscopic study of the Chevrel-phase compound $Fe_xMo_6S_8$," Physical Review B, vol. 33, issue 10, pp. 6652-6661, (1986).
Definition of "Octahedral cluster" printed from Wikipedia, the free encyclopedia, found at http://en.wikipedia.org/wiki/Octahedral_cluster.
Bjornsson, R. et al., "Identification of a spin-coupled Mo(III) in the nitrogenase iron-molybdenum cofactor", Chemical Science, vol. 5, pp. 3096-3103, (2014).
Chen, G-F. et al., "Advances in electrocatalytic $N_2$ reduction—strategies to tackle the selectivity challenge", Small Methods, vol. 3, No. 6, pp. 1800337-1-1800337-20, (2019).
Lu, K. et al., "Synergistic multisites $Fe_2Mo_6S_8$ electrocatalysts for ambient nitrogen conversion to ammonia", ACS Nano, vol. 15, No. 10, pp. 16887-16895, (2021).
Lu, K. et al., "Synergistic multi-sites $Fe_2Mo_6S_8$ electrocatalysts for ambient nitrogen conversion to ammonia", ACS Nano, Supplementary Information, vol. 15, No. 10, pp. S1-S9, (2021).
Definition of "Chemistry Industry", printed from Wikipedia, the free encyclopedia, found at http://en.wikipedia.org/wiki/Chemical_Industry.
Ortiz-Rodriguez, J.C. et al., "Stabilizing hydrogen adsorption through theory-guided chalcogen substitution in chevrel-phase $Mo_6X_8$ (X=S, Se, Te) electrocatalysts", ACS Applied Materials & Interfaces, vol. 12, No. 32, pp. 35995-36003, (2020).
Wang, Y. et al., "Engineering Mo—O—C interface in $MoS_2$@GO via charge transfer boosts hydrogen evolution", Chemical Engineering Journal, vol. 399, pp. 126018, (2020).
Solorzano, L., "Determination of ammonia in natural waters by the phenolhypochlorite method", Limnology and Oceanography, vol. 14, No. 5, pp. 799-801, (1969).
Wang, J. et al., "$FeMo_3S_4$ for efficient nitrogen reduction reaction", ACS Sustainable Chemistry & Engineering, vol. 8, pp. 12733-12740, (2020).
Hampshire, D.P., "Chevrel Phases", Handbook of Superconductivity, part B, B3, pp. 178-204, (2022).

\* cited by examiner

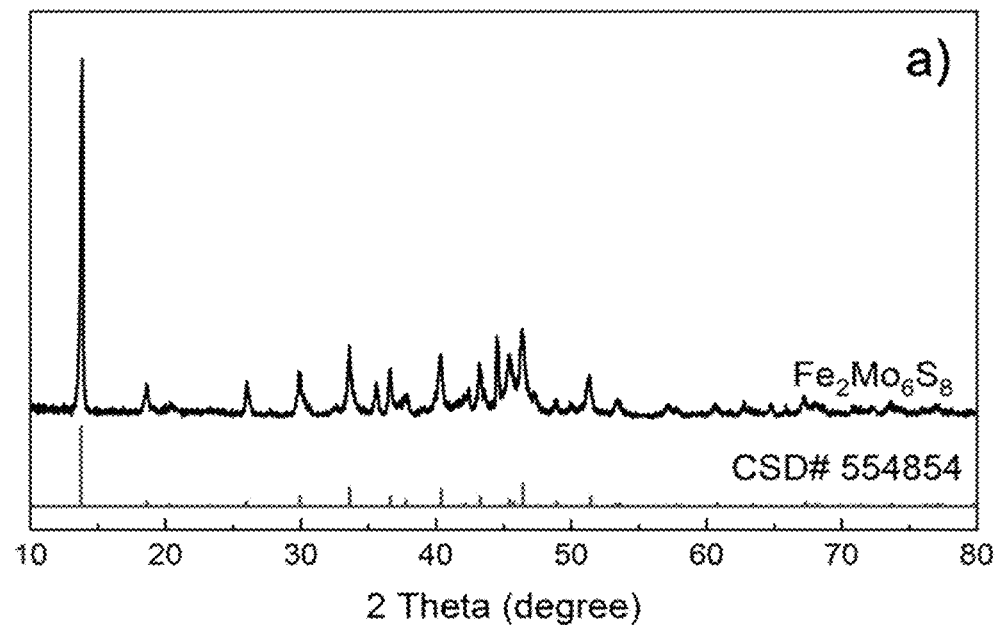
FIG. 5
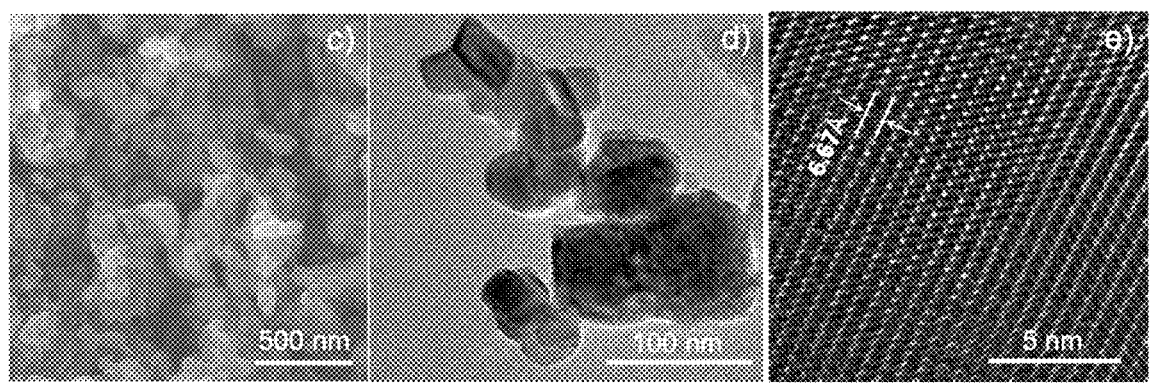
FIG. 6  FIG. 7  FIG. 8

ELECTROCHEMICAL PRODUCTION OF AMMONIA AND CATALYST THEREFOR

BACKGROUND

Ammonia ($NH_3$) is an essential feedstock for many industrial processes including agriculture, chemical production and pharmaceuticals.[1] It is also one of the most promising carriers for renewable electricity as it has a high energy density of 3 kWh $kg^{-1}$ and a 17.7 wt % hydrogen content.[2] The demand for ammonia has been continuously increasing and it is currently among the most highly produced inorganic chemicals (at ~500 million tons per year).[3] Unfortunately, the industrial production still relies on the Haber-Bosch process that was invented in the 1900s. This process requires centralized plants and operates under harsh conditions using hydrogen derived from fossil fuels (at 300~400° C., ~250 atm), it consumes 1~2% of the global energy supply and is responsible for >1% of total greenhouse gases emissions.[4,5] Therefore, it is crucial to develop alternative technologies for more affordable and sustainable $NH_3$ production, and the electrochemically based catalytic systems are among the most attractive candidates.[6-8] Such systems could in principle operate under ambient conditions and are integrable with renewable electricity to directly produce ammonia from humidified air in a carbon-neutral manner without reliance on fossil fuels.[9,10] It could also be implemented as stackable modules for on-demand and decentralized $NH_3$ production, therefore substantially mitigating the urgent energy and environmental challenges.[5,11]

The ambient electrocatalytic activation and conversion of $N_2$ in aqueous electrolytes faces substantial challenges, particularly in the lack of suitable electrocatalysts that are tuned specifically for highly selective $NH_3$ production.[9,12,13] The past decades of research examined a plethora of nanostructured catalysts, including noble and transition metals such as Ru, Pd, Au, Fe and Ni, doped porous carbon and a variety of metal oxides, nitrides and sulfides.[12,14-20] Unfortunately, almost all of these catalysts are plagued by slow kinetics and low Faradaic efficiency, with $NH_3$ production rates that are far from being competitive with the Haber-Bosch process.[21] Furthermore, the conversion to $NH_3$ involves transferring 6 electrons and protons to $N_2$ via complicated, multi-step processes which are very difficult to modulate due to inherent limitations of existing electrocatalysts. This is because the active sites of these catalysts generally have similar binding characteristics and could be best described as single site catalysts;[14,15,22-25] and during $N_2$ conversion these sites were most likely to first absorb the H-donating species ($H_3O^+$ or $H_2O$, depending on the pH) under electrochemical potential due to the low concentration and the highly inert N≡N triple bond of $N_2$. This step is likely followed by reaction with $N_2$ and generating the key $*N_2H$ intermediate for the final production of $NH_3$, either via proton-coupled electron transfer or hydrogenation with electrochemically generated $H_{ad}*$ processes.[15,26] Unfortunately, both steps have high energy barriers and low probability of occurrence so the majority the H-species proceed with the hydrogen evolution reaction (HER), thereby significantly compromising $NH_3$ selectivity.[27] Although these observations suggest that suppressing the HER is essential, it would be more important to design multi-active site catalysts that have separate binding sites for $N_2$ absorption, proton activation and simultaneous generation of activated $H_{ad}*$ and $N_2*$.[9,28] The synergy of these binding sites may substantially accelerate $NH_3$ formation when these intermediates are closely oriented on the catalyst surface. Design of such catalysts is an ongoing challenge and necessitates a better understanding and control of the catalytic materials and the reaction mechanism.

In nature, metalloenzymes such as MoFe nitrogenase convert $N_2$ to $NH_3$ under ambient condition. These enzymes typically have a $N_2$ binding protein (the cofactor) and a reducing protein, both containing several subunits with multiple Fe, Mo and S atoms at different oxidation states.[29] These subunits provide binding sites that synergistically assist $N_2$ adsorption and transformation to $NH_3$.[30] These natural biocatalysts have inspired intensive efforts on designing molecular analogues to mimic the process, but rarely on heterogeneous catalysts that are potentially more durable for practical applications.[31]

SUMMARY

In a first aspect, the present invention is an iron containing Chevrel phase material, containing iron and $Mo_6S_8$ clusters.

In a second aspect, the present invention is an electrode, comprising (1) a conductive substrate, and (2) an iron-containing Chevrel phase material, on the conductive substrate.

In a third aspect, the present invention is a system for producing ammonia electrochemically from $N_2$ and water, comprising (a) a working electrode, comprising (1) a conductive substrate, and (2) the iron-containing Chevrel phase material, on the conductive substrate. The system also comprises (b) a counter electrode, and (c) an ion-conductive separator between the working electrode and the counter electrode.

In a fourth aspect, the present invention is a facility for manufacturing ammonia, comprising (A) a system for producing ammonia electrochemically from $N_2$, and water, (B) a power source, (C) a water feed, and (D) an ammonia dispenser.

In a fifth aspect, the present invention is a method of producing ammonia electrochemically from $N_2$ and water, with a system for producing ammonia electrochemically from $N_2$ and water, comprising passing electricity through the working electrode and the counter electrode, to produce ammonia from $N_2$ and water.

Definitions

Faradaic efficiency, FE, of an electrochemical process for producing ammonia from $N_2$ and $H_2O$ means the number of electrons consumed in the reaction $N_2+6H^++6e^-\rightarrow 2NH_3$, divided by the total number of electrons consumed by the system, and may be calculated using the following equation:

$$FE(NH_3)=[3F\times c(NH_3)\times V]/Q$$

where F is the Faraday constant (96485 C $mol^{-1}$), Q is the total charge passed through the electrode, V is the volume of the electrolyte and $c(NH_3)$ is the quantified ammonia concentration. Alternatively, "$c(NH_3)\times V$" in the equation may be replaced by the total number of moles of ammonia produced.

The mass-normalized yield rate of $NH_3$ for a catalyst used in an electrochemical process for producing ammonia from $N_2$ and $H_2O$ may be calculated using the following formula $$\text{Yield Rate}_{mass}(NH_3)=[17\times c(NH_3)\times V]/(t\times m)$$

where t is the electrolysis time, m is the loading mass of the catalyst, V is the volume of the electrolyte and $c(NH_3)$ is the quantified ammonia concentration. Alternatively, "$c(NH_3)\times V$" in the equation may be replaced by the total number of moles of ammonia produced.

The term "particle size" of a particle means the diameter of a circle having the same area as that of a particle when viewed by transmission electron microscopy. The term "average particle size" mean the average of the particle sizes of a collection of particles.

As used herein, the term "Chevrel phase material" means a compound that contains $Mo_6S_8$ clusters, such as those illustrated in FIG. 1. A Chevrel phase material may be identified by a variety of methods, including X-ray crystallography and powder X-ray diffraction (XRD).

BRIEF DESCRIPTION OF THE DRAWINGS

FIG. 5 illustrates the structural characterizations of the as-synthesized $Fe_2Mo_6S_8$ electrocatalyst by X-ray diffraction pattern.

FIG. 6, FIG. 7 and FIG. 8 are a scanning electron microscopy (SEM) image and transmission electron microscopy (TEM) images of as-synthesized $Fe_2Mo_6S_8$ at different magnifications.

DETAILED DESCRIPTION

Figure 1:
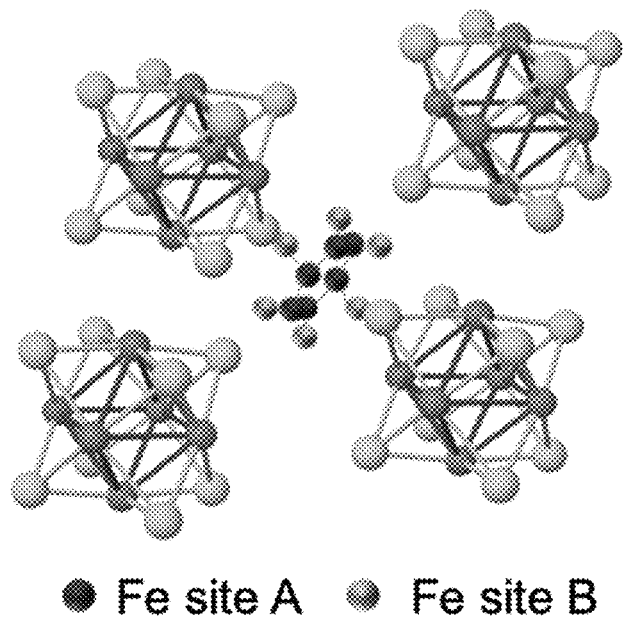
FIG. 1 is a schematic illustration of the crystal structure of $Fe_2Mo_6S_8$ showing interconnected $Mo_6S_8$ clusters and the two possible Fe ions sites around the trigonal axis.

The iron-containing Chevrel phase chalcogenides, including $Fe_2Mo_6S_8$ and $Fe_4Mo_6S_8$, are highly efficient electrocatalysts for selective electrochemical conversion of $N_2$ to $NH_3$. With the preferred $Fe_4Mo_6S_8$, stable Faradaic efficiencies of up to 25% were observed at −0.20 V vs. RHE together with a high rate of 102 µg h$^{-1}$ mg$_{cat}^{-1}$ for $NH_3$ production in aqueous electrolyte. The formation of $NH_3$ from $N_2$ was confirmed from a series of control experiments including the $^{15}N_2$ isotope labeling test, and the catalyst exhibited outstanding stability for at least 50 hours. The intrinsic activities were attributed to the unique atomic configurations of Fe, Mo and S in the iron-containing Chevrel phase chalcogenides, including $Fe_4Mo_6S_8$, that provide separate but synergistic binding sites for $N_2$ and H addition. Experimental evidence points to the Fe/Mo sites being responsible for absorbing and activating $N_2$ with the Fe-promoted S sites providing stronger S—H binding that effectively suppressed the hydrogen evolution reaction. The distinctive coordination environment in the Fe—$Mo_6S_8$ framework ensures synergy of these active sites that accelerate association of key intermediates for selective $NH_3$ production.

The iron-containing Chevrel phase compounds may be produced by mixing the elements and/or compounds containing the elements, in the desired proportions, together with grinding, followed by high-temperature heating under an inert atmosphere.[33] Molybdenum and sulfur are always present in a ratio of 6:8. Iron is always present, in an iron:molybdenum:sulfur ratio of x:6:8 where 0<x≤6, preferably 2≤x≤4, and more preferably x=4. In the case where x=1 or 6, the product may contain impurities. Other metals may also be present, based on the formula $Fe_xM_yMo_6S_8$, wherein M is at least one metal selected from the group consisting of elements of Groups 1-15 and the Lanthanide series, 0<x≤6, 0≤y<6, and x+y=1 to 6, preferably $Fe_xMo_6S_8$ (where y=0 in the more general formula); more preferably M is at least one metal selected from the group consisting of elements of Groups 1, 2, 3, 7, 10, 11, 12, and the Lanthanide series, $2 \leq x \leq 4$, and x+y=2 to 4; most preferably M is a metal selected from Cu, Cd, Na, Mn and Zn, $2 \leq x \leq 4$, and x+y=2 to 4. Examples include $FeMo_6S_8$, $Fe_2Mo_6S_8$, $Fe_3Mo_6S_8$, $Fe_4Mo_6S_8$, $Fe_5Mo_6S_8$ and $Fe_6Mo_6S_8$, as well as $Fe_xMo_6S_8$ having non-integer value of x in between. Iron-containing Chevrel phase compounds of the formula $Fe_xMo_6S_8$ or $Fe_xM_yMo_6S_8$, where x<2 or 4; or x+y<2 or 4, respectively, may also be formed by forming the phase $Fe_xM_yMo_6S_8$, where x+y=2, with M including Cu or Na, followed by oxidation to cause deintercalation of the Cu or Na; oxidation may be carried out chemically (for example, with a mixed acid containing 8.0 M HCl and 0.05 M $HNO_3$) or electrochemically. Similarly, for composition $Fe_xM_yMo_6S_8$, where x+y>2, a compound of the formula $Fe_xM_yMo_6S_8$, where x+y=2 may be formed, followed by intercalation with metal ions (such as Li, Na or Cu) through chemical or electrochemical reduction. Examples of metal M in any of the above formulas include the elements magnesium, aluminum, calcium, scandium, chromium, manganese, nickel, cobalt, copper, zinc, gallium, yttrium, ruthenium, rhodium, palladium, silver, cadmium, indium, tin, lanthanum, cerium, praseodymium, neodymium, samarium, europium, gadolinium, terbium, dysprosium, holmium, erbium, thulium, ytterbium, lutetium, rhenium, osmium, iridium, platinum, gold, mercury, lead and mixtures thereof. In an alternative of any of the above compositions, $Fe_xMo_6S_8$ where x=1, x=1 or 2, or $1 \leq x \leq 2$, are excluded from the catalyst compositions.

When used as a catalyst, the iron-containing Chevrel phase material may be used as produced, or may be milled to provide a greater surface area. When used as a catalyst, the iron-containing Chevrel phase material may be formed into a catalyst ink, containing the iron-containing Chevrel material, a liquid (such as water, ethanol, acetone or mixtures thereof), a binder (such as a hydrogen-conductive polymer or other water-insoluble polymer), and optionally a conductive material (such as carbon or graphite).

Figure 2:
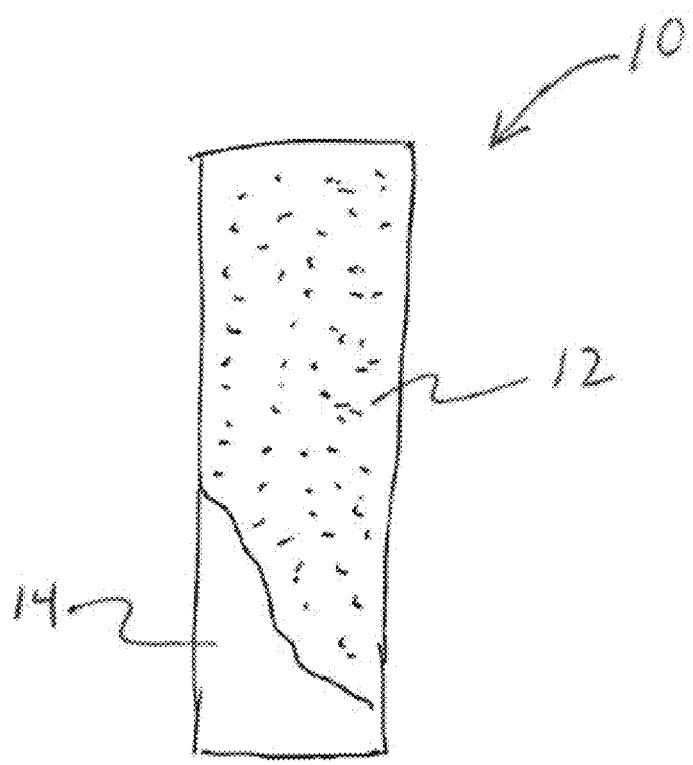
FIG. 2 illustrates a working electrode.

As illustrated in FIG. 2, a working electrode, 10, includes catalyst, 12, on and in electrical contact with a conductive substrate, 14. The conductive substrate may be formed from any conductive material which will not significantly react with the catalyst or the electrolyte solution under the condition of use. Examples of conductive materials include carbon (such as graphite or glassy carbon), steel, nickel, copper, gold, platinum, and alloys thereof. The working electrode may have any convenient shape, such as a rod, disc, or may form the container which holds the electrolyte solution. The catalyst may be attached to the substrate using an adhesive, for example a hydrogen-ion conductive polymer solution, such as a solution of NAFION™ in water and isopropanol. Typically, the catalyst in particulate form is mixed with a liquid adhesive to from a catalyst ink, which is then applied to the surface of the conductive substrate. The electrode is formed when the adhesive dries. In addition, polyvinylidene difluoride (PVDF) and polytetrafluoroethylene (PTFE) may also be used as binders for holding the catalyst to the conductive substrate. In the case of a solid-state system (described below) the adhesive or binders may be used to hold the catalyst on the solid-state electrolyte and/or the conductive gas diffusion layer.

Figure 3:
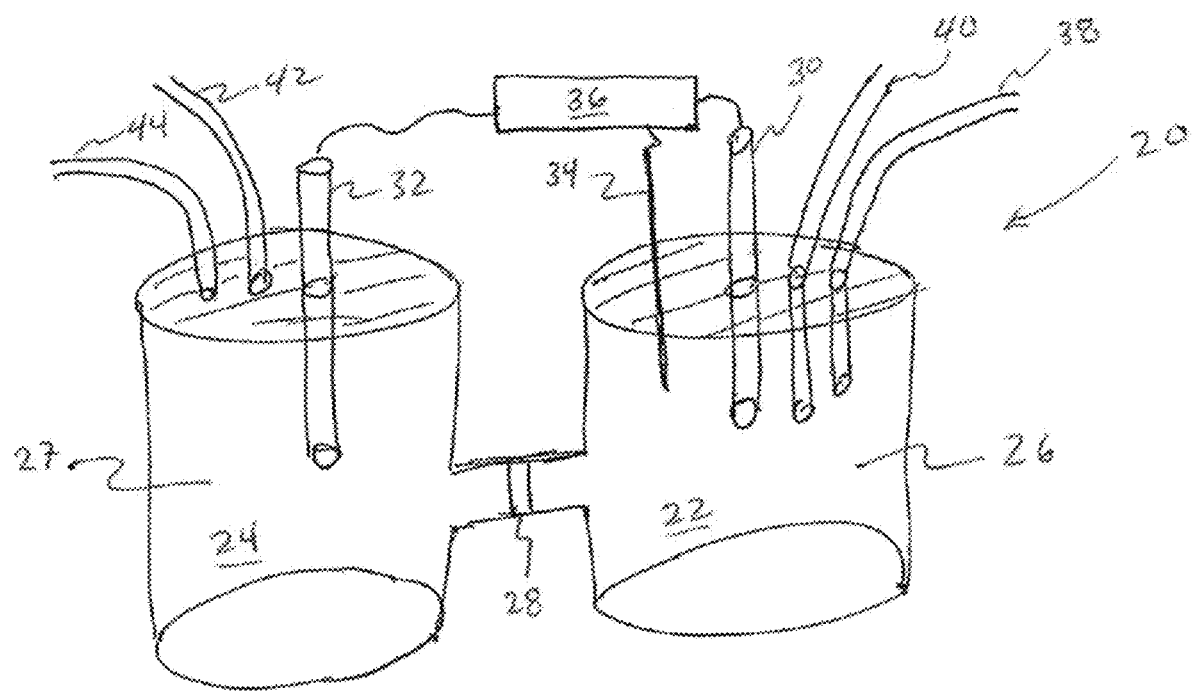
FIG. 3 shows a system for producing ammonia electrochemically.

As illustrated in FIG. 3, a system for producing ammonia electrochemically, 20, includes a container having a cathode compartment, 22, and an anode compartment, 24, in ion-conductive communication with each other (during operation), with each holding a cathode electrolyte solution, 26, and an anode electrolyte solution, 27, respectively. A separator, 28, allows ions to pass between the two compartments, but otherwise prevents bulk mixing; examples of a separator may be a hydrogen-ion conductive membrane such as NAFION™ membrane, or simply a porous material which allows ions to pass between the fluids, such as a porous membrane, for example cellulose, cardboard or a glass frit. Within the cathode compartment are the working electrode, 30, and the optional references electrode, 34, which are in contact with the cathode electrolyte solution and in electrical communication with an electrochemical power supply (which may also include an electrochemical monitor, controller and/or work station), 36. Similarly, the counter electrode, 32, is within the anode compartment and is in contact with the anode electrolyte solution. Also illustrate are optional inlets and outlets for the addition or removal, respectively, of reactants and products, from the cathode and anode compartments including a nitrogen gas inlet, 38, an ammonia outlet or cathode electrolyte solution outlet and/or inlet, 40, a water inlet or anode electrolyte solution inlet and/or outlet, 44, and an oxygen gas outlet, 42.

Figure 31:
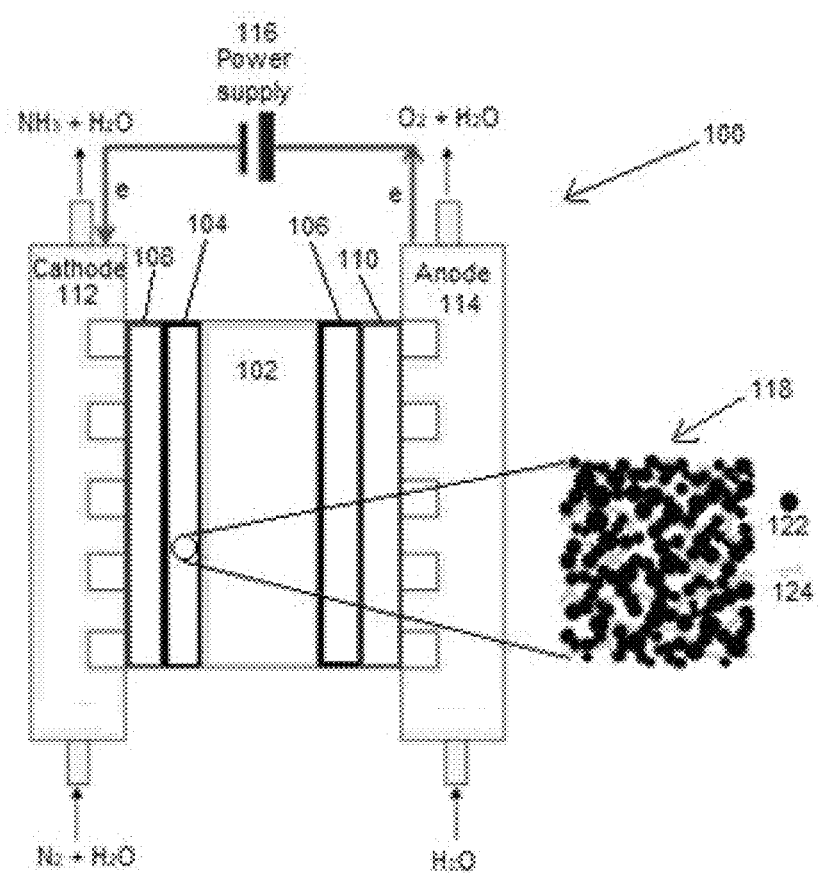
FIG. 31 shows a solid-state system for producing ammonia electrochemically.

FIG. 31 shows a solid-state system, 100, for producing ammonia electrochemically. The system includes a cathode conductive gas diffusion layer, 108, and anode conductive gas diffusion layer, 110, in contact with the cathode conductive base, 112 (cathode), and anode conductive base, 114 (anode), respectively. A catalysts layer, 104, is in contact with the cathode gas diffusion layer and the solid electrolyte, 102. Also shown is an optional anode product layer, 106, which is in contact with the solid electrolyte and the anode gas diffusion layer; if the anode product layer is absent, then the solid electrolyte is in contact with the anode gas diffusion layer. The anode product layer may contain an oxidation product catalyst. A magnified view of the catalytic layer, 118, shows an intimate mixture of a catalyst, 122, and an adhesive or binder, 124. The cathode conductive gas diffusion layer together with the catalyst layer forms the working electrode, while the anode conductive gas diffusion layer together with the optional anode product layer forms the counter electrode. As shown, nitrogen gas and water (reactants) are supplied to the working electrode, and ammonia is produced, while water is supplied to the counter electrode where oxygen is produced. A carrier gas, such as nitrogen, argon or air may be included with the reactants and water supplied to the electrodes. Liquid water may also be present in the catalyst layer and/or in the gas diffusion layers. A power supply, 116, is present to provide electrical power to drive the production of ammonia. The materials used and the system as a whole are similar to those of a solid-state water electrolysis cell, except using the catalyst of the present application in the catalytic layer, and using a proton conductive material, such as a NAFION™ membrane, as the solid electrolyte. See, for example, ref. 56.

Ammonia may be from by passing an electric current through the working electrode (cathode) and the counter electrode (anode), producing ammonia from water and nitrogen gas, and producing oxygen at the counter electrode. If an electrolyte solution is present, the ammonia produced will typically dissolve in the electrolyte solution, forming ammonium salts. Preferably, the electrolyte solution is acidic, having a pH of less than 7, more preferably a pH of less than 5, for example a pH of 3-4. As the ammonia is formed, it will cause the electrolyte solution to become less acidic, so inclusion of a buffer to help maintain the desired pH is preferred. Over time, a continuous synthesis of ammonia may be carried out by removing the ammonia (or ammonium salt) containing electrolyte, and adding fresh electrolyte solution. The electrolyte at the counter electrode may become more acidic, so addition of acid, water, and/or fresh electrolyte may be desirable. Ammonia may be isolated as ammonium salts from the electrolyte solution, or may be obtained as ammonia gas using chemical methods. In a solid-state system, continuous production of ammonia is also possible, with a continuous supply of reactants and removal of products.

Nitrogen will be consumed at the working electrode and oxygen (or another oxygen-containing product such as hydrogen peroxide) will be produced at the counter electrode, so it may be desirable to add nitrogen gas at the working electrode and remove oxygen gas at the counter electrode; alternative the nitrogen may simply be suppled from ambient air, and oxygen released to the ambient air. Water may be supplied as a gas by humidifying the supplied nitrogen, or by addition of liquid water to the electrolyte solution.

The iron-containing Chevrel phase material is a very active and efficient catalyst for the electrochemical production of ammonia. The mass-normalized yield rate of $NH_3$ production in the electrochemical production of ammonia from water and nitrogen gas is preferably at least 25 μg/h per mg of catalyst, more preferably 50 μg/h per mg of catalyst, and most preferably at least 100 μg/h per mg of catalyst including 70-100 μg/h per mg of catalyst. The Faradaic efficiency of the reaction in the electrochemical production of ammonia from water and nitrogen gas is preferably at least 12%, more preferably at least 20% and most preferably at least 25%, including 12% to 25%. Greater values of mass-normalized yield rate and Faradaic efficiency may be achieved by adjust the temperature and/or pressure of the reaction, as well as amount of nitrogen dissolved in the electrolyte solution.

Figure 4:
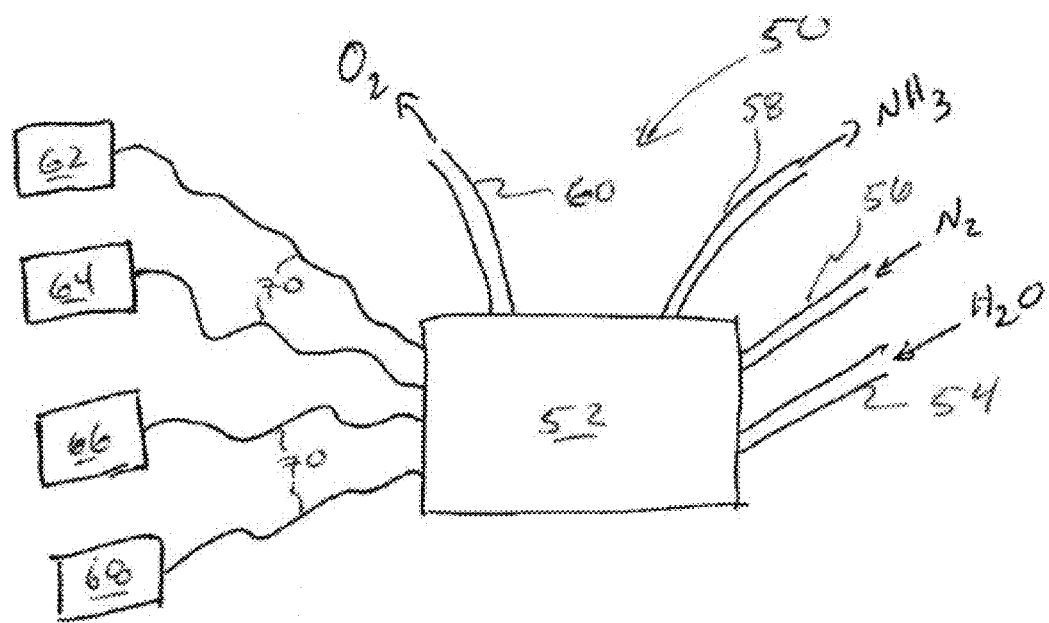
FIG. 4 shows a facility for manufacturing ammonia.

As illustrated in FIG. 4, a facility for manufacturing ammonia, 50, includes a system for producing ammonia electrochemically, 52, a water feed, 54, an optional nitrogen feed, 56, an ammonia dispenser for dispensing ammonia, ammonia containing gas, or ammonia or ammonium containing solution, 58, and an optional oxygen dispenser, 60. Also illustrated are power sources from providing electrical power to the facility, which may include one or more sources including hydroelectric or geothermal power source, 62, solar power source, 64, wind power source, 66, and municipal or generator power source, 68, which are electrically connected to the facility by electrical cables, 70.

EXAMPLES

Example 1

Materials and Methods

Chemicals: Iron sulfide (99%, Sigma-Aldrich), molybdenum disulfide (>99%, Sigma-Aldrich), molybdenum (≥95%, VWR), copper sulfide (>99%, Alfa Aesar), nitric acid (98%, Fisher Scientific), hydrochloric acid (HCl, 37.3% Fisher Scientific), ammonium hydroxide (30%, Sigma-Aldrich), ammonium chloride (≥98%, Sigma-Aldrich), sodium hypochlorite solution (NaClO, available chlorine>5.0%), sodium hydroxide (98.8%, Fisher Scientific), sodium citrate dehydrate (>99%, Fisher Scientific), phenol (>99%, ACROS), sodium nitroferricyanide dihydrate (>99%, ACROS), p-dimethylaminobenzaldehyde (>99.9%, Fisher Scientific), and NAFION™ (5 wt %, Sigma-Aldrich). All chemicals were used as-received without further purification.

Synthesis $Fe_2Mo_6S_8$. In a typical procedure, 0.88 g FeS, 1.44 g Mo and 2.40 g $MoS_2$ were loaded to a ball milling jar inside a Ar-filled glove box. The jar was then sealed and transferred out and was milled with a high-energy mechanical miller (8000 M, SPEX SamplePrep, USA) for 9 hours. After this process, the powders were collected and transferred to a Lindberg Blue tube furnace. The tube furnace was heated to 1000° C. for 10 hours under the flow of 100 sccm Ar, and was then cooled to room temperature. The product was $Fe_2Mo_6S_8$.

Preparation of $Mo_6S_8$: $Mo_6S_8$ particles were prepared from $Cu_2Mo_6S_8$ by acid leaching off $Cu^{2+}$. The $Cu_2Mo_6S_8$ powders were synthesized using the method as detailed in our previous publications.[47] In a typical procedure, 3.0 g of the as-synthesized $Cu_2Mo_6S_8$ powders were added to 50 ml of the mixed acid containing 8.0 M HCl and 0.05 M $HNO_3$. The mixture was stirred at room temperature for 1 day and was then collected by centrifuge, washed repeatedly with water until pH neutral, and was then dried under vacuum at 100° C.

Materials Characterization

Powder XRD was recorded using a Rigaku Miniflex diffractometer, with a Cu Kα radiation (λ=1.5406 Å, 30 kV, 15 mA). The microstructures of the prepared samples were collected by SEM images on a field-emission Hitachi S-4700-II microscope. TEM images were obtained on a JEOL JEM-2100F microscope at 200 kV. XPS measurements were performed on a Thermal Escalab 250 X-ray photoelectron spectrometer, and the binding energies were calibrated by assigning the C 1s peak at 284.5 eV. Raman spectra were collected on a Renishaw inVia Raman microscope with a 532 nm laser. Specific surface area and pore size distribution in powder samples were analyzed using a Micromeritics Tristar 3000 analyzer. UV-vis absorbance spectra were measured applying a SHIMADZU UV-1800 UV-vis spectrophotometer. $^{57}Fe$ Mössbauer spectra were recorded in transmission mode using a $^{57}Co/Rh$ radiation source with a Kr proportional counter on a constant acceleration drive (SEECO, Edina, MN). The isomer shifts were given relative to α-Fe and the velocity was calibrated using a α-Fe foil. The $Fe_2Mo_6S_8$ sample was prepared by pressing ca. 200 mg powders into pellets (approximately 15 mm in diameter and 2 mm in thickness), and were measured at ambient temperature with a velocity range of ±8.0 mm $s^{-1}$.

Electrochemical Studies

All electrochemical tests were performed using a Pine bipotentiostat electrochemical workstation (Pine Instruments, USA) and a two-compartment H-cell separated by a NAFION™ 211 membrane (Fuelcell Store) at room temperature. A standard three-electrode configuration was used, with a saturated calomel reference electrode (SCE) and a rotating disk glassy carbon electrode coated with relevant catalysts working electrode in one compartment of the H-cell and the a graphite rod counter electrode was in the other compartment of the H-cell. The electrolytes used in this work were 0.5 M $Na_2SO_4$ and 0.1 M sodium citrate buffer (pH=4.0). The catalyst ink was prepared by mixing 10 mg catalyst with 1.9 mL water/isopropanol (1:3 v/v) and 0.1 ml 5 wt % NAFION™ solution. The mixture was sonicated for 30 min to form uniform dispersion. To prepare the working electrode, 8 μL of the catalyst ink was drop-casted onto a 5 mm glassy carbon rotating disk electrode. The mass loading was 0.2 mg $cm^{-2}$. The linear sweep voltammograms (LSVs) were collected at 5 mV $s^{-1}$. All LSV curves were iR corrected using the standard equation of $E_{corrected}=E_{measured}-iR_s$, where $E_{corrected}$, $E_{measured}$ and i refers to the iR-corrected potential, measured potential and recorded current, respectively. $R_s$ is the equivalent resistance measured by electrochemical impedance spectroscopy (EIS)

employing the same electrode configuration. The potentiostat tests were performed at different potentials including −0.15, −0.20, −0.25, −0.30, −0.40, −0.50 vs. RHE. The electrochemically active surface area, $A_{ECSA}$, was estimated using the equation of $A_{ECSA}=C_{dl}/C_s$, where the $C_{dl}$ and $C_s$ refer to the double layer capacitance and a specific capacitance value of 22 μF cm$^{−2}$, respectively.[48, 49]

Ammonia detection: The indophenol blue method was employed to quantify the concentration of ammonia generated in the electrochemical cell.[50] Three solutions were prepared for this method, including the phenol solution, prepared by adding 20.0 g phenol in 100 ml ethanol; the sodium nitroprusside solution, prepared by dissolving 1.0 g sodium nitroferricyanide in 200 ml water in an amber bottle; the alkaline reagent, prepared by dissolving 100 g sodium citrate and 5 g sodium hydroxide in 500 ml water. The oxidizing solution was prepared fresh each time by mixing 10 ml stock alkaline reagent and 2.5 ml sodium hyphchlorite (NaClO) solution. The calibration curve was established using standard NH$_4$Cl stock solution, in the concentration range of 0, 0.5, 1, 5, 10, 50 and 100 μM. In each test 3.0 ml of the standard solution with the designated NH$_4$Cl concentration was mixed with 0.12 ml phenol solution, 0.12 ml sodium nitroprusside solution and 0.3 ml oxidizing solution. The mixed solution was mixed using a vortex mixer and allowed to stand at room temperature for at least 1 hour in the dark. The concentration of indophenol blue was determined using the absorbance at the wavelength of 640 nm. The fitting curve shows good linear relationships. The ammonia concentration in the electrolyte was estimated using the calibration curve, and samples were prepared by mixing 3.0 ml electrolyte, 0.12 ml phenol solution, 0.12 ml sodium nitroprusside solution and 0.3 ml oxidizing solution. The same aging time and analysis protocol were used.

$^{15}$N isotopic labeling experiment. $^{15}$N$_2$ was used as the feeding gas, a low velocity gas. After electrolysis at −0.25 V vs. RHE for 10 hours. 0.9 ml of the concentrated electrolyte was collected, followed by adding 0.1 ml of D$_2$O as the internal standard. The produced ammonia was quantified using $^1$H nuclear magnetic resonance measurements ($^1$H NMR; Bruker 300 MHz).

N$_2$H$_4$ detection: The concentration of the hydrazine was determined by the Watt and Chrisp method.[51] The coloring reagent was prepared by mixing 300 ml ethanol, 30 ml concentrated HCl, and 5.99 g p-dimethylaminobenzaldehyde. In a typical test, 5 ml of the electrolyte solution after the NRR potentiostatic test was collected and mixed with 5 ml of the coloring reagent solution. The resulting solution was stirred for 10 min, and its absorbance was measured at a wavelength of 455 nm. Standard hydrazine monohydrate solutions at a series of concentrations in 0.5 M Na$_2$SO$_4$ and 0.1 M sodium citrate buffer were prepared to establish the calibration curve.

Faraday efficiency: The Faraday efficiency (FE) and mass-normalized yield rate of NH$_3$ production were calculated using the following equation:[52]

$$FE(NH_3)=[3F \times c(NH_3) \times V]/Q$$

$$\text{Yield Rate}_{mass}(NH_3)=[17 \times c(NH_3) \times V]/(t \times m)$$

where F is the Faraday constant (96485 C mol$^{−1}$), t is the electrolysis time, m is the loading mass of the catalyst, Q is the total charge passed through the electrode, V is the volume of the electrolyte and c(NH$_3$) is the quantified ammonia concentration.

The surface-area normalized yield rate of NH$_3$ production was quantified using the equation:

$$\text{Yield Rate}_{ESCA}(NH_3)=[17 \times c(NH_3) \times V]/(t \times A_{ESCA})$$

where $A_{ESCA}$ is the electrochemically active surface area.

Results and Discussion

Figure 9:
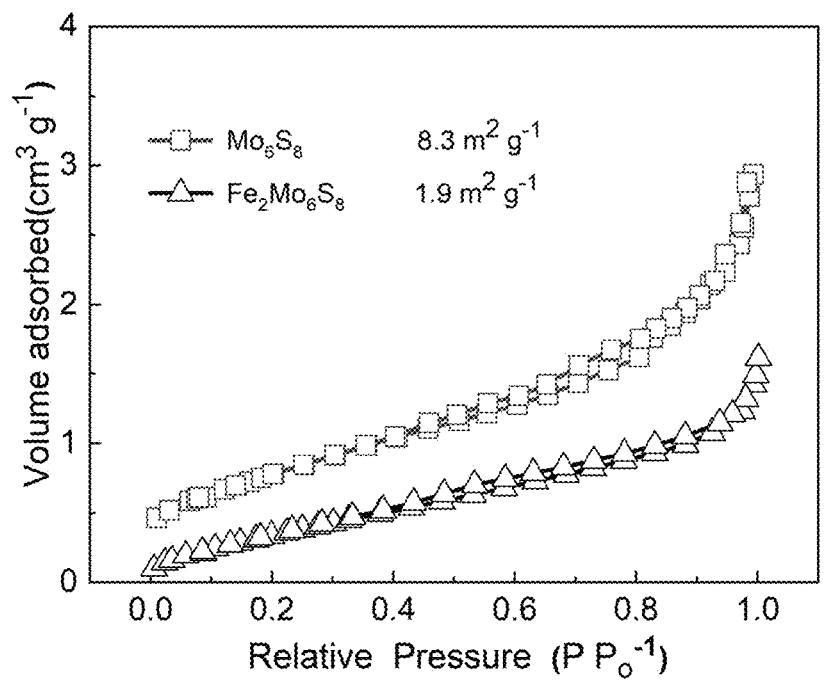
FIG. 9 is a graph comparing nitrogen absorption-desorption isotherm of $Fe_2Mo_6S_8$ and $Mo_6S_8$. The measured BET specific surface area is also included.

Phase pure Fe$_2$Mo$_6$S$_8$ catalysts were synthesized using a two-step method. First, FeS, Mo and MoS$_2$ powders with the molar ratio of 2:3:3 were loaded in a ball-milling container inside an Ar-filled glove box and were milled for 9 hours using a high-energy mechanical miller. The milled mixture was collected and transferred to a tube furnace and calcined under Ar at 1000° C. for 10 hours, which resulted in formation of nearly pure Fe$_2$Mo$_6$S$_8$ powders (typically ~4.0 g). The powder X-ray diffraction analysis of the as-synthesized particles revealed patterns that index well with the rhombohedral structure of the Chevrel phase with the R$\bar{3}$ space group (FIG. 5).[32] The structure can be viewed as three-dimensional frameworks with interconnected quasi-rigid Mo$_6$S$_8$ clusters, each of which has a Mo$_b$ octahedral surrounded by a S$_a$ cube. The Fe-ions distribute among sites A and B in channels structured by Mo$_6$S$_6$ clusters as illustrated in FIG. 1, which is comparable to Cu-ions in Cu$_2$Mo$_6$S$_8$ from previous studies given their similar cation size.[33] The scanning (SEM) and transmission electron, microscope (TEM) images revealed that the particles have a wide size distribution of 10~100 nm (FIG. 6, FIG. 7 and FIG. 8). Most particles were aggregated due to the nature of ball-milling based synthesis and have rough surfaces with abundant edges and corners, which usually have higher electrocatalytic activity compared with flat basal planes.[34] The high resolution TEM images revealed a large (101) rhombohedral lattice spacing of 6.67 Å, which is slightly larger than the 6.45 Å of Mo$_6$S$_8$ due to Fe-ions induced lattice expansions (FIG. 8).[35] in addition, the produced Fe$_2$Mo$_6$S$_8$ catalysts exhibited a Brunauer-Emmett-Teller (BET) specific surface area of only ~2 m$^2$ g$^{−1}$ due to their relatively large size compared with conventional catalysts (FIG. 9).

The produced Fe$_2$Mo$_6$S$_8$ particles were directly studied without further treatments as electrocatalysts for ambient N$_2$ reduction reaction (NRR). A two compartment H-type electrochemical cell separated by a piece of NAFION™ 211 membrane was employed together with a three-electrode setup to avoid contaminations from electrolysis products formed at the counter electrode in the analysis of N$_2$ conversion products.[15] A saturated calomel reference electrode (SCE) and a 4.0 mm rotating disk glassy carbon working electrode (RDE) were mounted in one compartment and a graphite rod counter electrode was mounted in the other compartment of the H-cell. The electrolyte was an optimized aqueous solution of 0.5 M Na$_2$SO$_4$ mixed with 0.1 M sodium citrate (pH~4.0), where the Na$_2$SO$_4$ was added to ensure ionic conductivity. The catalyst loading was 0.2 mg cm$^{−2}$ for all experiments and no carbon additive was employed in the formulation of the catalyst inks in order to assess the true activities of Fe$_2$Mo$_6$S$_8$ and avoid interferences from carbon.[36] In addition, all electrolysis was tested with 800 rpm to ensure uniform N$_2$ feed to electrocatalysts.

Figure 10:
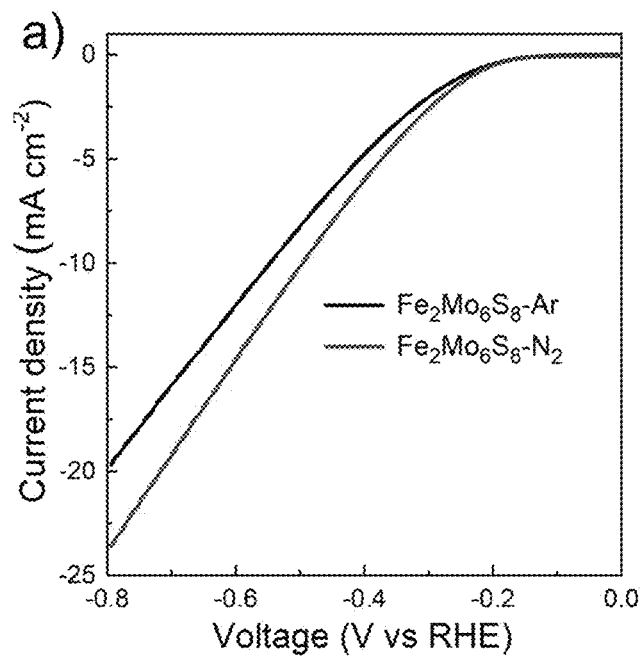
FIG. 10 is graphs showing linear sweep voltammetry curves of the electroreduction of $N_2$ to $NH_3$ on the $Fe_2Mo_6S_8$ catalyst in Ar- and $N_2$-saturated electrolytes, with a scan rate 5 mV/s.
Figure 11:
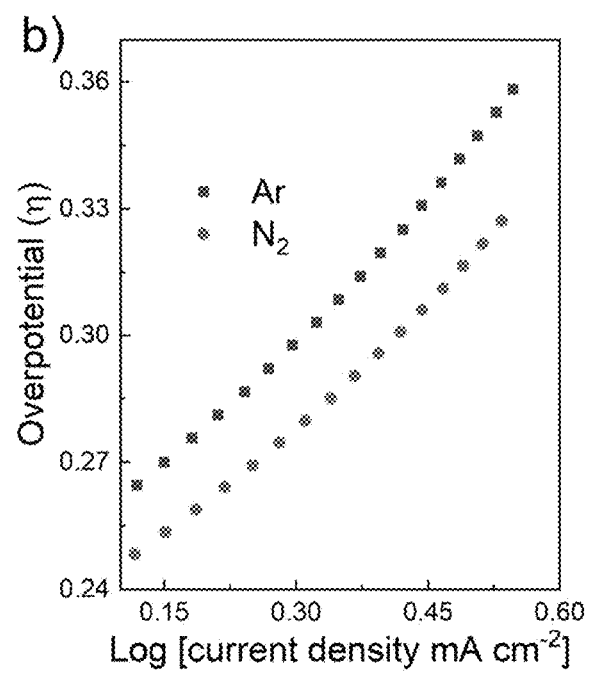
FIG. 11 illustrates the corresponding Tafel plots for FIG. 10.

The catalysts were first activated in the Ar-saturated electrolyte using cyclic voltammetry between −0.1 and 0.2 V (vs. RHE, at 10 mV s$^{−1}$) until the voltammogram stabilized. This small voltage range is essential to avoid anodic leaching of Fe-ions from Fe$_2$Mo$_6$S$_8$. FIG. 10 compares the iR-corrected anodeic linear sweep voltammograms (LSV) in Ar and N$_2$ saturated electrolytes at 5 mV s$^{−1}$. The voltammogram under N$_2$ exhibited noticeably larger current densities, suggesting Faradaic contributions from electrochemical reactions that are associated with $N_2$. FIG. 11 compares Tafel plots derived from the LSV results. The voltammogram under Ar exhibited a Tafel slope of 203 mV dec$^{-1}$ for the HER, which suggest sluggish HER kinetics that is beneficial for improving $NH_3$ selectivity.[27] In contrast, the slope decreased to 170 mV dec$^{-1}$ in the $N_2$-saturated electrolyte, clearly suggesting electrochemical processes that $N_2$-assisted $H_{ad}$* generation and/or removal from the catalyst surface.

Figure 12:
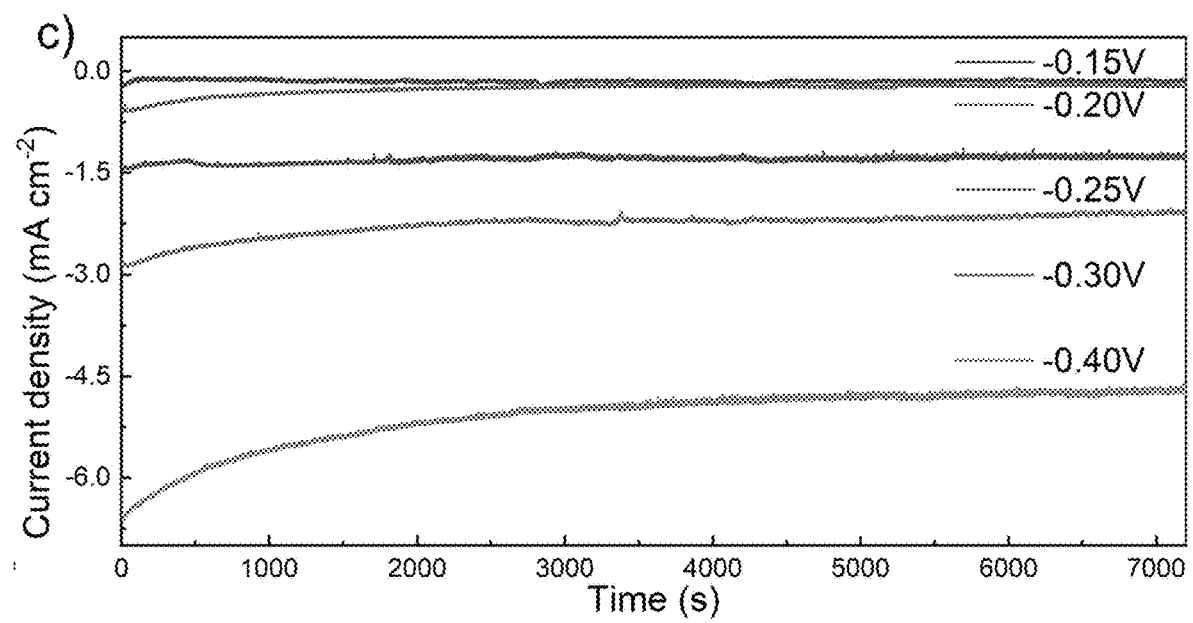
FIG. 12 are chronoamperometric curves at different electrode potentials (vs. reversable hydrogen electrode (RHE)) for 2 hours of the electroreduction of $N_2$ to $NH_3$ on the $Fe_2Mo_6S_8$ catalyst.
Figure 13:
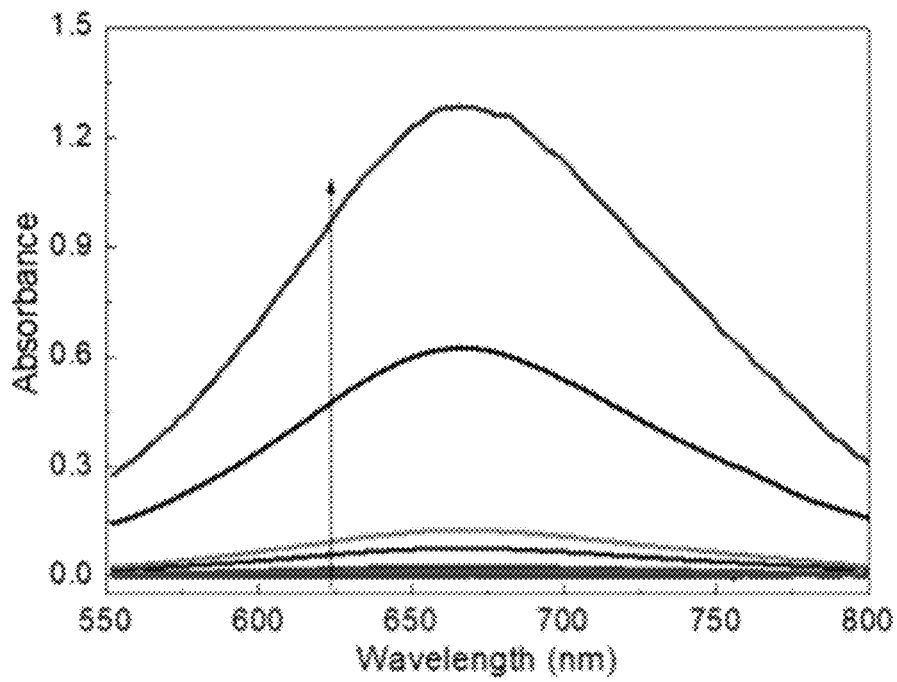
FIG. 13 is the UV-Vis absorption spectra of $NH_4^+$ quantification using the indophenol blue method.
Figure 14:
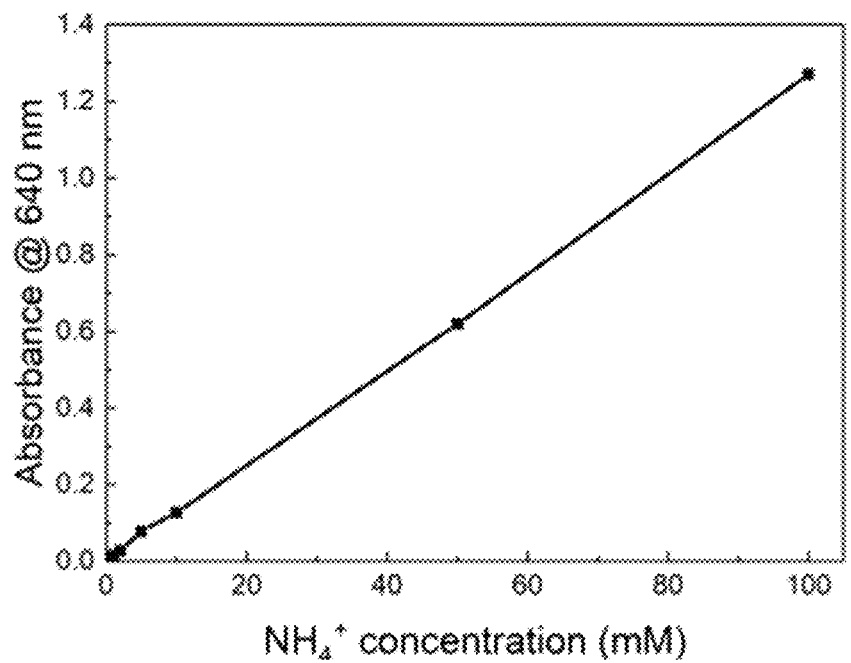
FIG. 14 is a calibration curves based on the absorbance at 665 nm for $NH_4^+$ quantification using the indophenol blue method.
Figure 15:
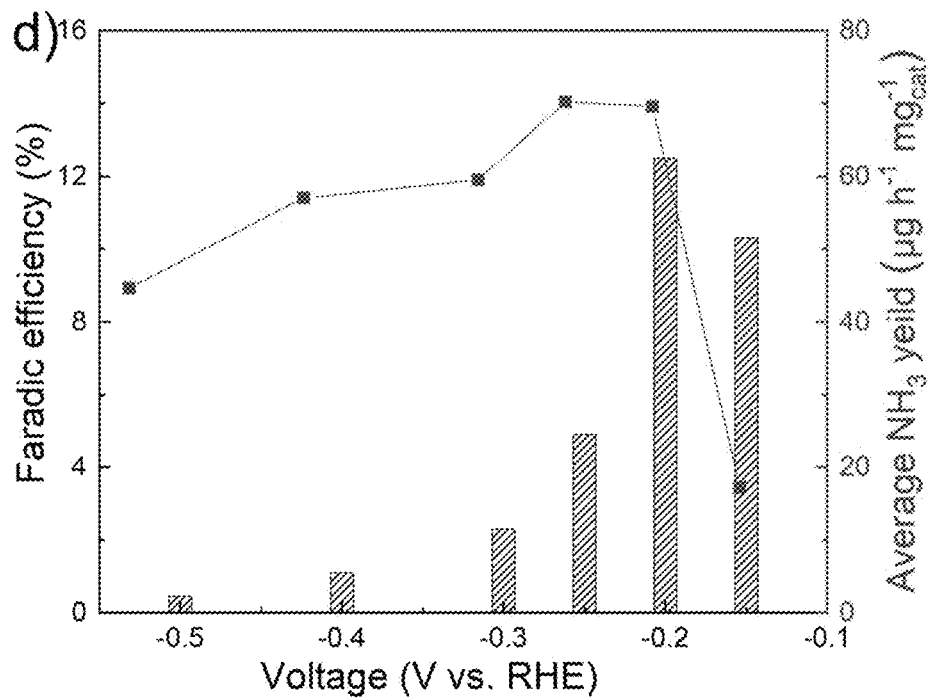
FIG. 15 shows a comparison of Faradaic efficiency (curve) and corresponding $NH_3$ yield rates (bars) under different applied potential for the electroreduction of $N_2$ to $NH_3$ on the $Fe_2Mo_6S_8$ catalyst.

We then performed chronoamperometry tests under $N_2$ bubbling and analyzed the collected electrolytes to validate $NH_3$ synthesis activity of the $Fe_2Mo_6S_8$ catalyst. FIG. 12 presents the chronoamperometric curves for 2 hours under the applied potentials of −0.15, −0.20, −0.25, −0.30, −0.40 (vs. RHE). Notably, the current density at different potentials remained relatively stable throughout all testing, revealing good stability of $Fe_2Mo_6S_8$ and can be ascribed to its unique framework structure.[37] The collected electrolytes were analyzed for $NH_3$ concentration using the indophenol blue method in reference to standard $NH_4Cl$ solutions (FIG. 13 and FIG. 14),[38] and the results are presented in FIG. 15 for $NH_3$ yield rates and Faradaic efficiencies (FE) under different potentials (with the curve being Faradaic efficiency, and the bars showing the yield in the figure). The $Fe_2Mo_6S_8$ catalyst exhibited remarkable activities for catalyzing $N_2$ to $NH_3$ despite its orders-of-magnitude lower specific surface area compared with prevalent electrocatalysts.[39] The formation of ammonia was clearly detected at −0.15 V (vs. RHE), with an FE of 10.3% and $NH_3$ production rate of 17 μg h$^{-1}$ mg$_{cat}^{-1}$. The electrolysis at −0.20 V vs. RHE, on the other hand, exhibited the best combination of FE and $NH_3$ production rate. While the FE increased slightly to 12.5%, the $NH_3$ yield rate increased approximately five-fold to ~70 μg h$^{-1}$ mg$_{cat}^{-1}$ and suggesting boosted $N_2$ conversion despite the current density only increasing two-fold to ~0.25 mA cm$^{-2}$. This small current density is vital for high FE and was obtained by inhibiting the HER through the synergistic Fe—$Mo_6S_8$ modulations as discussed below. As expected, the FE decreased gradually at more negative potentials, reaching to ~5% at −0.25 V and ~3% at −0.30 V due to rapid rising of HER activity. Interestingly, the $NH_3$ production rate remained relatively stable at 50~70 μg h$^{-1}$ mg$_{cat}^{-1}$. Similarly stable production rates were also observed with the Pd/C catalyst suggesting the production rate was likely limited by soluble $N_2$ in the electrolyte.[15] In addition, we performed control experiments with Ar-saturated electrolyte or $N_2$-saturated electrolyte but without $Fe_2Mo_6S_8$, and confirmed that no detectable $NH_3$ was observed in both cases.

Figure 16:
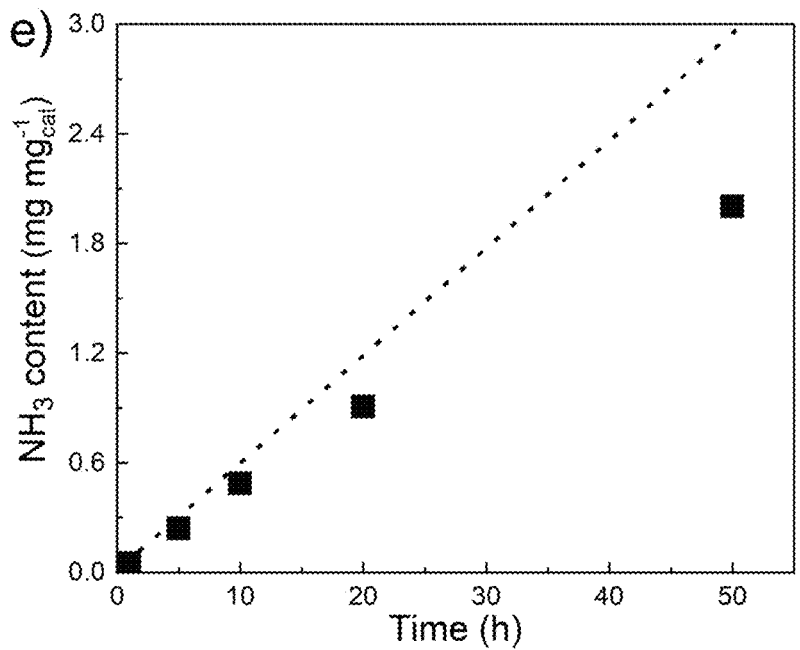
FIG. 16 is a graph showing the durability of the $Fe_2Mo_6S_8$ catalysts as revealed from the relationship between ammonia content and electrolysis duration for 50 hours (at 0.2V vs. RHE) during the electroreduction of $N_2$ to $NH_3$ on the $Fe_2Mo_6S_8$ catalyst.
Figure 17:
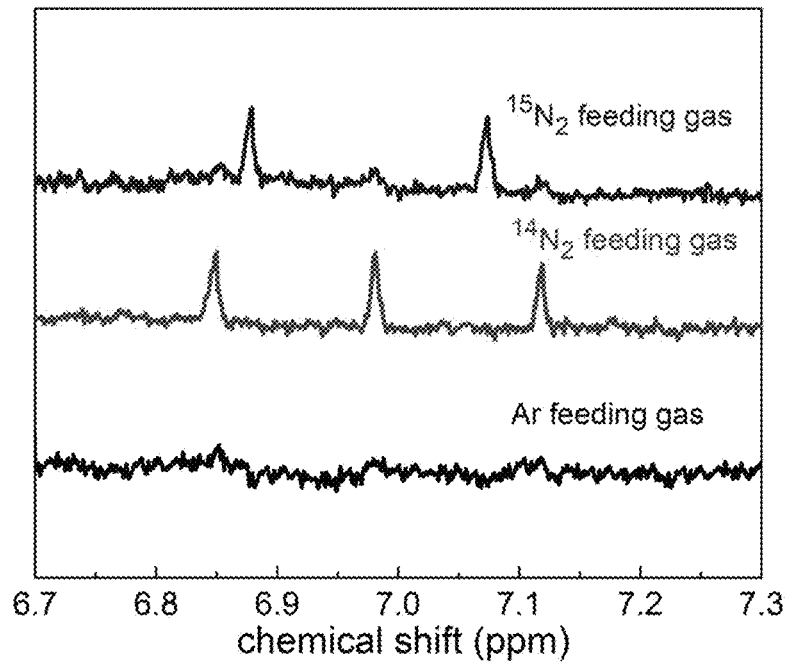
FIG. 17 shows the NMR analysis of electrolyte solutions from $^{14}N_2$ and $^{15}N_2$ feeding gases.
Figure 18:
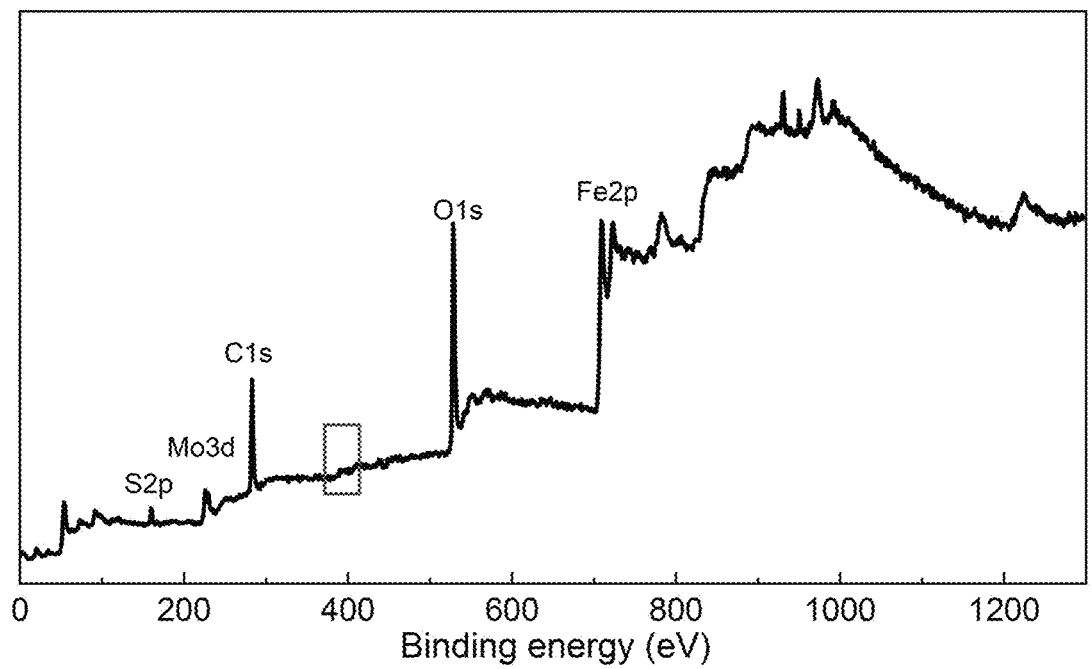
FIG. 18 is a survey XPS spectrum of the $Fe_2Mo_6S_8$ catalyst. No features corresponding to $N_1s$ (squared-off area) was observed, confirming no N species were present in the catalyst.
Figure 19:
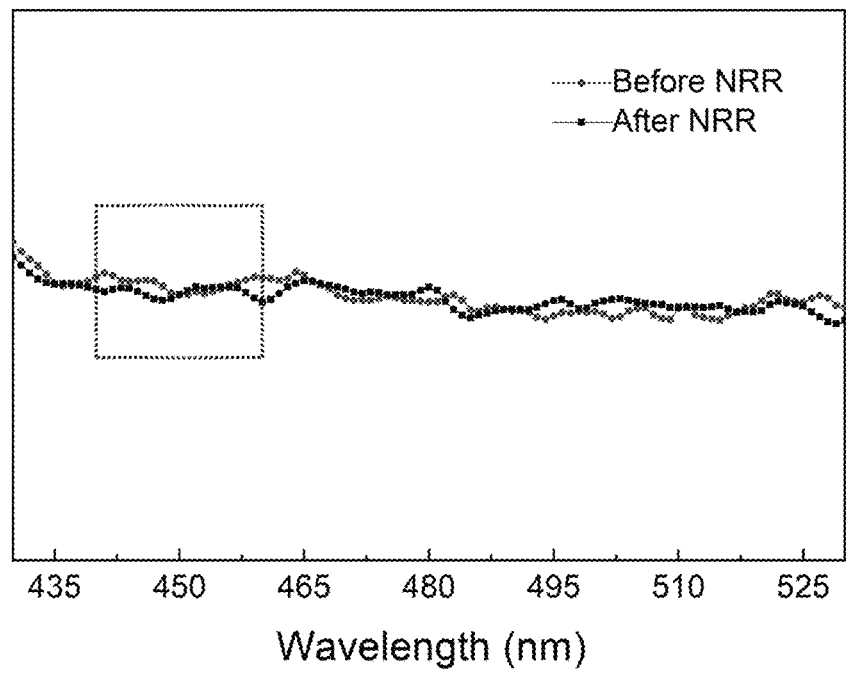
FIG. 19 is a comparison of UV-Vis absorption spectra of mixed solutions containing 5 ml $N_2H_4$ coloring solution with either 5 ml fresh or electrolyzed electrolyte. No characteristic absorption peak was observed at ~455 nm, confirming no formation of $N_2H_4$ during nitrogen conversion reaction.

FIG. 16 presents the relationship between ammonia concentration and electrolysis duration at the optimal potential of −0.20 V vs. RHE. A nearly linear relationship was observed, with a slope corresponding to the yielding rate of ~70 μg h$^{-1}$ mg$_{cat}^{-1}$ at this potential (dashed line), further demonstrating that $Fe_2Mo_6S_8$ is a highly stable catalyst for ambient electrochemical $N_2$ conversion. A slight departure from the linear relationship was observed after 20 hours, this is likely due to the gradual pH change of the electrolyte solution (from 4.0 to 4.9 after 50 hours of electrolysis), and this changed the activity of $H_3O^+$ causing the slight departure from the ideal condition. We further employed the $^{15}N_2$ isotope labeling experiment to confirm the observed $NH_3$ was indeed generated from $N_2$ (FIG. 17).[40] The $^1H$ NMR spectrum of electrolyte collected with $^{15}N_2$ feeding gas revealed a doublet coupling that corresponds to $^{15}NH_4^+$. In comparison, the triplet coupling for $^{14}NH_4^+$ was observed in the electrolyte produced with $^{14}N_2$ feeding gas. This comparison clearly confirms the true activity of $Fe_2Mo_6S_8$ catalysts for $N_2$ to $NH_3$ conversion. In addition, X-ray photoelectron spectroscopy (XPS) confirmed the $Fe_2Mo_6S_8$ catalysts did not contain any nitrogen-species, and therefore the formation of ammonia from catalyst decomposition is unlikely to be a concern (FIG. 18).[41] Besides $NH_3$, the $N_2$ conversion could possibly proceed along an alternative pathway and produce $N_2H_4$. In this study, no detectable formation of $N_2H_4$ was recorded using the Watt and Chrisp method (FIG. 19).[42] The UV-Vis absorption spectra of samples prepared from fresh electrolyte and electrolyte after 2 hours of electrolysis at −0.2 V vs RHE did not exhibit any features corresponding to $N_2H_4$, confirming nearly exclusive electrocatalytic $N_2$ conversion to $NH_3$.

Figure 20:
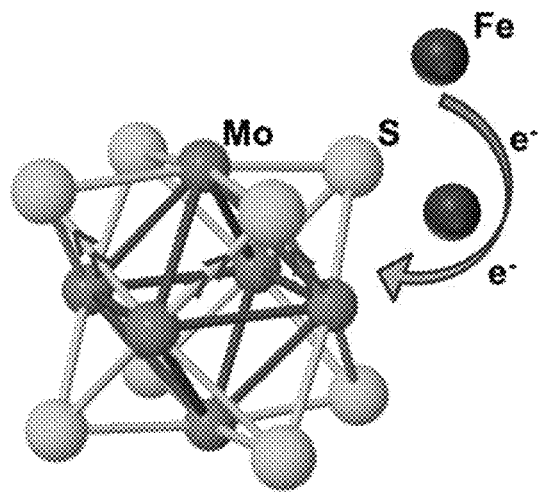
FIG. 20 is a schematic illustration of the charge transfer of Fe to $Mo_6S_8$.
Figure 21:
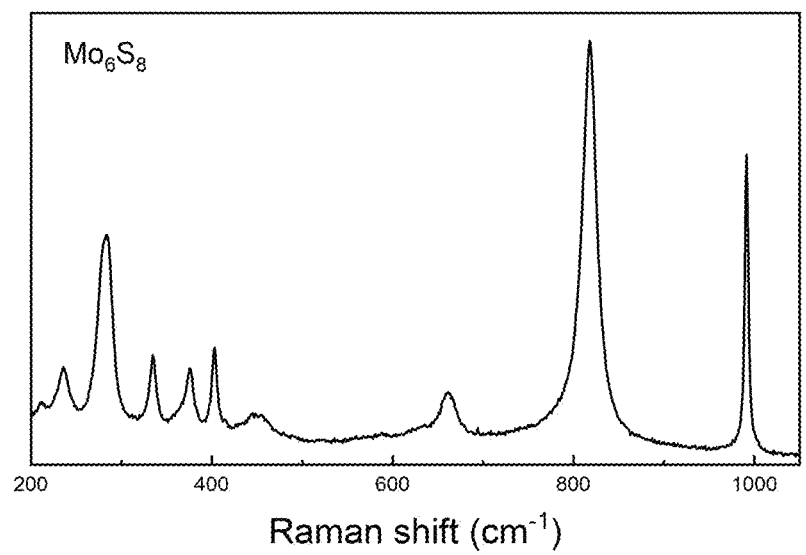
FIG. 21 is the Raman spectrum of $Mo_6S_8$.
Figure 23:
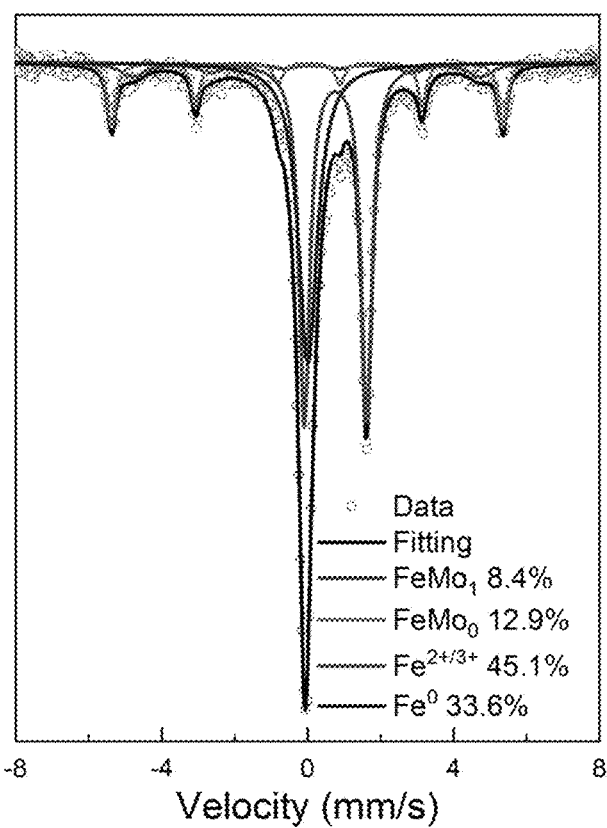
FIG. 23 is the Mössbauer spectroscopy of $Fe_2Mo_6S_8$.
Figure 22:
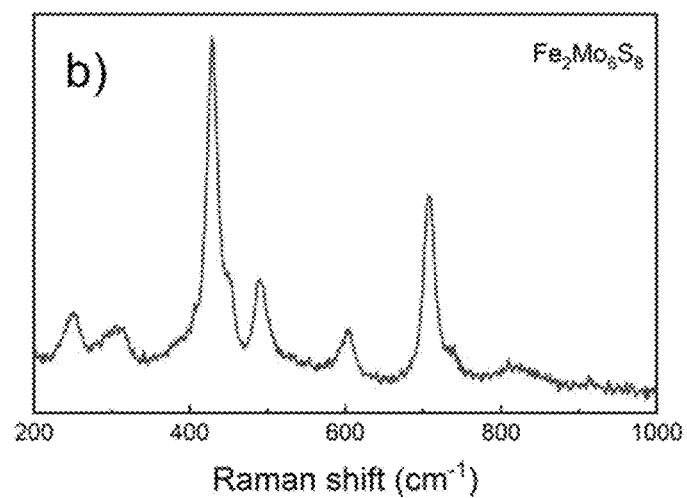
FIG. 22 is the Raman spectrum of $Fe_2Mo_6S_8$.
Figure 24:
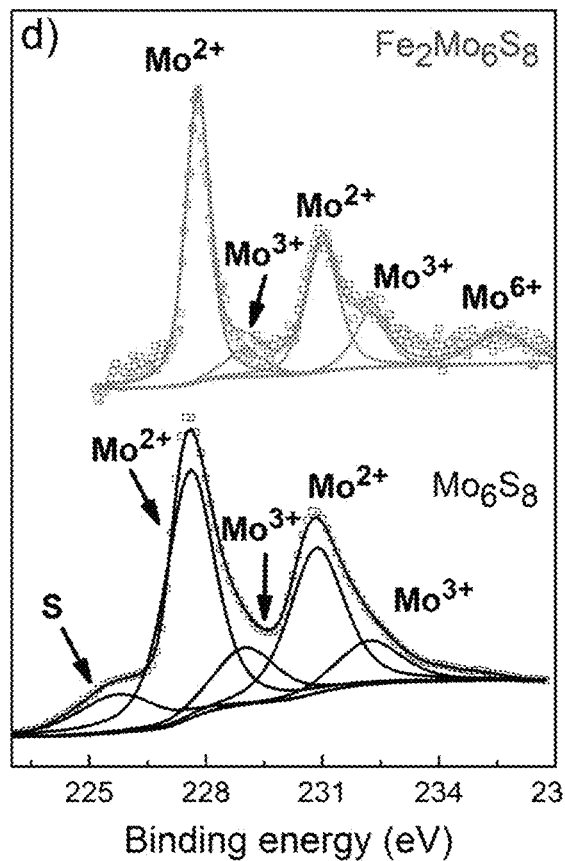
FIG. 24 and FIG. 25 are high resolution X-ray photoelectron spectra of Mo 3d and S 2p.
Figure 25:
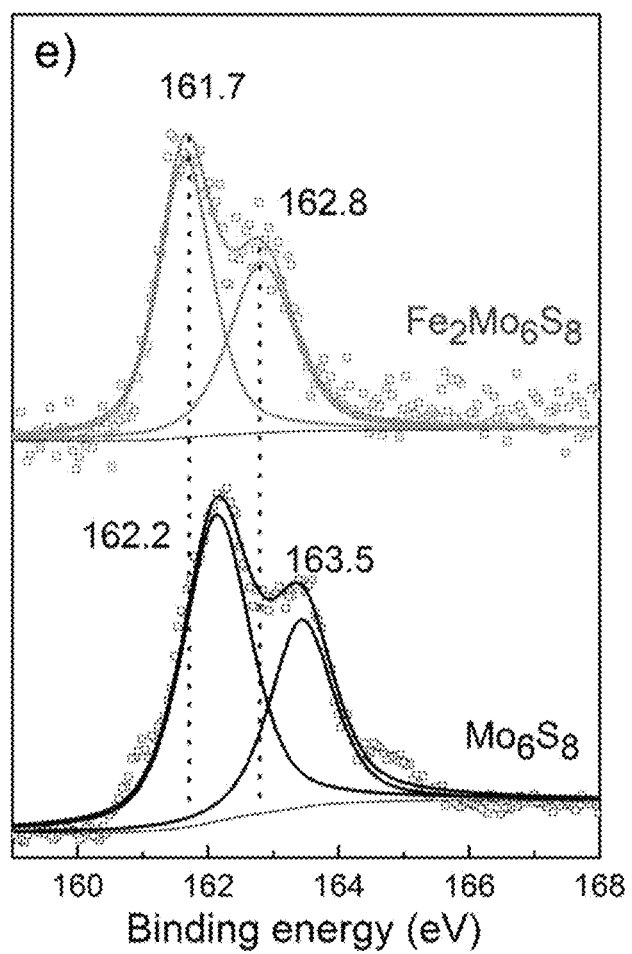

The $Fe_2Mo_6S_8$ catalyst is a pure compound and its active sites should be based on its multi-element Fe, Mo and S configuration, which enables superior $N_2$ conversion (FIG. 20). Indeed, previous theoretical studies outlined that Fe-ions moderate the catalytic activities of $Mo_6S_8$ via three effects: the ligand effect where Fe donates electrons to $Mo_6S_8$ and increases electron densities on Mo and S, the ensemble effect where Fe directly participates in binding key reactants/intermediates, and the confinement effect where the unique configuration of Fe, Mo and S spatially confine reactions to proceed along specific pathways.[37, 43] Here, the Fe—$Mo_6S_8$ modulations were studied by spectroscopic characterizations of $Fe_2Mo_6S_8$, and the spectra from $Mo_6S_8$ were collected as references (FIG. 21). FIG. 22 presents the Raman spectrum of $Fe_2Mo_6S_8$, which when compared to the spectra of FeS and $Mo_6S_8$ confirms resonance peaks from the $E_g$ and $A_g$ vibration modes of Fe, S and Mo.[44] The type of Fe species present in $Fe_2Mo_6S_8$ were established using Mössbauer characterizations at room temperature (FIG. 23). The fitting of the spectrum suggests three major types of Fe species (see Table 1 for detailed fitting parameters), with 21.3% as $FeMo_1$ and $FeMo_0$ alloys (0 and 1 refer to number of nearby Mo atom), 33.6% as $Fe_0$ and 45.1% as Fe ions that can be described as $Fe^{2+}/Fe^{3+}$ mixtures.[45, 46] The presence of multiple Fe species can attribute to the unique versatile framework structure of the Chevrel phase structure. The exact roles of each Fe species on $N_2$ conversion are unclear and will be studied in following works. We do note, however, that similar Fe species were described in the FeMo cofactor protein and Fe-ions with multiple oxidation states are probably essential for synergistic $N_2$ absorption and activation.[9, 30] The high-resolution XPS spectra revealed increased electron densities on Mo and S in $Fe_2Mo_6S_8$ and therefore confirmed the ligand role of Fe on modulating $Mo_6S_8$ (FIG. 24 and FIG. 25). The results suggest S in $Fe_2Mo_6S_8$ has 0.5~0.8 eV lower binding energies than in $Mo_6S_8$; for Mo, a portion of $Mo^{3+}$ in $Mo_6S_8$ was reduced to $Mo^{2+}$ in $Fe_2Mo_6S_8$. These results agree well with theoretical predictions, and the ligand effect play keys roles for inhibiting HER and improving $NH_3$ selectivity.

TABLE 1

Fitting parameters for Fe-species identified by Mossbauer spectrum (FIG. 23)[53,54]

| Component | Isomer shift, mm/s | Quadrupole splitting, mm/s | Magnetic field, KOe | Area, % |
|---|---|---|---|---|
| $FeMo_1$ | 0.023 | 0.130 | 295.0 | 8.43 |
| $FeMo_0$ | 0.001 | 0.043 | 332.4 | 12.87 |
| $Fe^{2+}/Fe^{3+}$ | 0.746 | 1.703 | 0 | 45.09 |
| $Fe^0$ | 0.014 | 0.001 | 0 | 33.60 |

Figure 26:
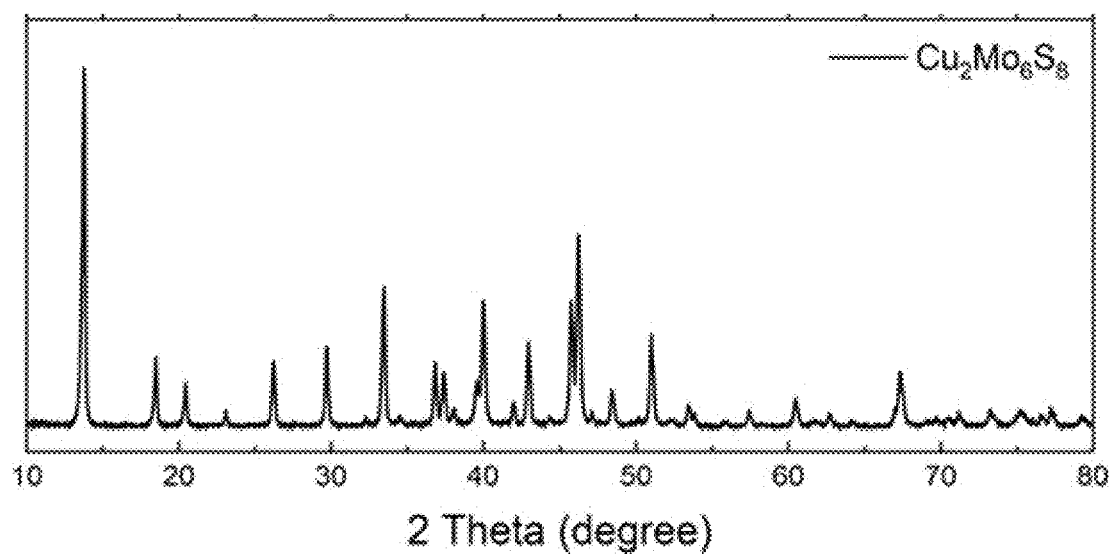
FIG. 26 and FIG. 27 illustrate the powder X-ray diffraction patterns of $Mn_2Mo_6S_8$ and $Cu_2Mo_6S_8$, respectively, confirming their pure Chevrel phase structure.
Figure 27:
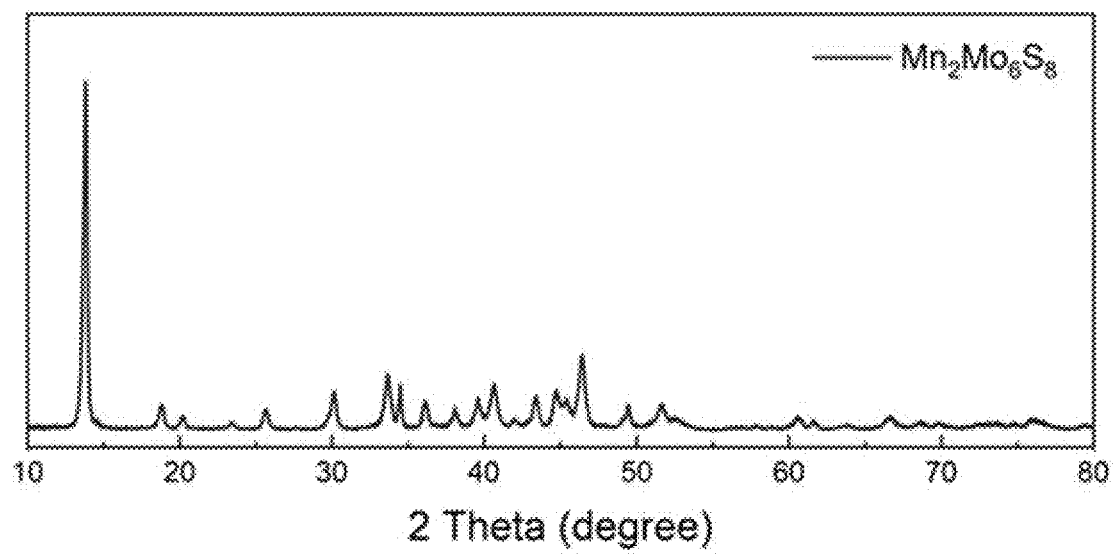
Figure 28:
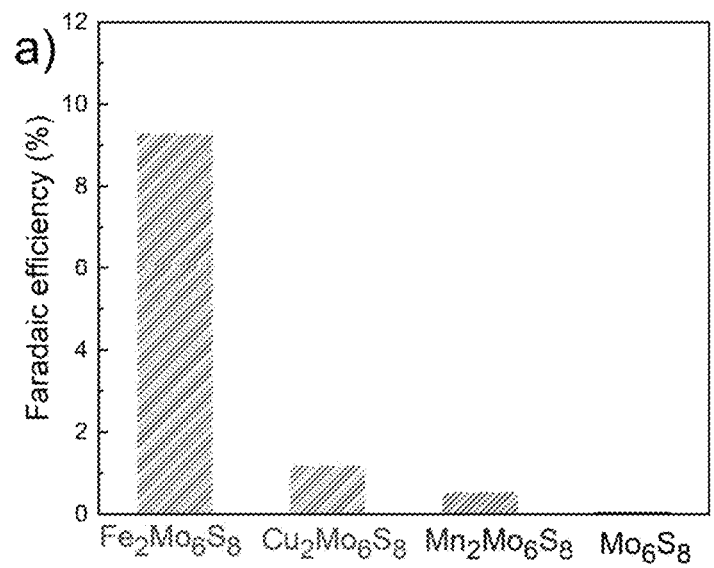
FIG. 28 is a comparison of $N_2$ to $NH_3$ conversion efficiency for $Mo_6S_8$ and $M_2Mo_6S_8$ (M=Fe, Mn and Cu) electrocatalysts.
Figure 29:
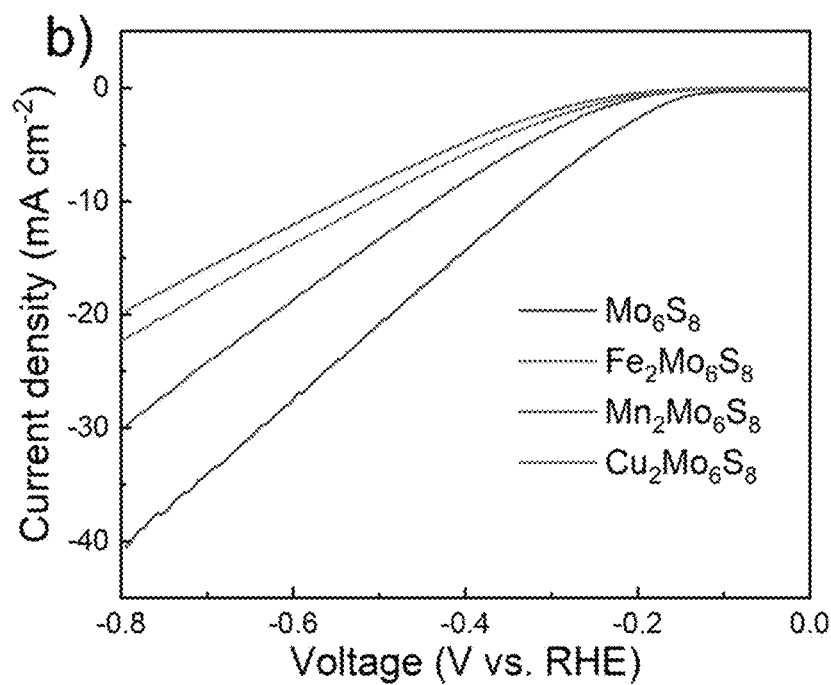
FIG. 29 are LSV curves for hydrogen evolution of $Mo_6S_8$ and $M_2Mo_6S_8$ (M=Fe, Mn and Cu) electrocatalysts in Ar-saturated electrolyte.
Figure 30:
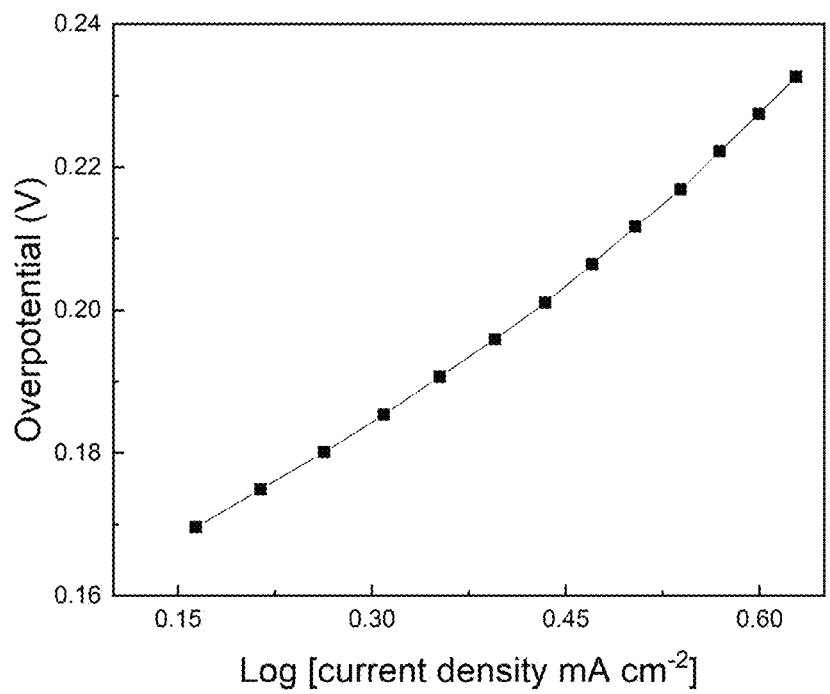
FIG. 30 is a Tafel plot of $Mo_6S_8$ catalysts in Ar-saturated electrolyte.

The ensemble effect of Fe-species in $Fe_2Mo_6S_8$ plays a vital role in $N_2$ to $NH_3$ conversion,[43] as control catalysts with the same Chevrel phase structure but different composition, including $Cu_2Mo_6S_8$, $Mn_2Mo_6S_8$ (FIG. 26 and FIG. 27 for XRD) and $Mo_6S_8$, all exhibited much lower activity at −0.2V vs. RHE (FIG. 28). This comparison suggests that Fe must participate in the absorption and/or conversion of $N_2$ while Mo/S atoms alone were unable to activate $N_2$. Rather, they assist generation and stabilization of the hydrogen intermediate $H_{ad}*$ by providing strong S—H binding, which is essential to inhibit the undesired HER.[34] This inhibiting effect was strengthened with metal cations in $Mo_6S_8$ (the ligand effect), as higher overpotentials and smaller current densities for the HER were observed for $Fe_2Mo_6S_8$, $Cu_2Mo_6S_8$ and $Mn_2Mo_6S_8$ (FIG. 29). Notably, Fe-ions exhibited the most pronounced ligand effect with the $Fe_2Mo_6S_8$ catalysts having the most sluggish kinetics for the HER, with a ~100 mV higher overpotential and ~50% lower current density compared with $Mo_6S_8$, along with a much larger Tafel slope (203 vs 114 mV $dec^{-1}$ for $Mo_6S_8$, FIG. 11 and FIG. 30). The ligand effect of Fe increases electron density on S as discussed above, which strengthens the $S—H_{ad}*$ binding and extends the lifespan of $H_{ad}*$ for robust association with $*N_2$. Overall, these understandings could be rationalized into a tentative mechanistic view of the reaction pathway. In this model, the highly conductive $Fe_2Mo_6S_8$ functions as a true multi-site catalyst and has dedicated binding sites for $*N_2$ and $*H$ on Fe/Mo and S, respectively. The unique spatial geometry of Fe, Mo and S in $Fe_2Mo_6S_8$ catalysts confine these two key intermediates in close proximity for promoted association and formation of $NH_3$, leading to a remarkable $NH_3$ production rate of 70 μg $h^{-1}$ $mg_{cat}^{-1}$. Furthermore, this rate translates into a surface normalized production rate of 3.5 μg $h^{-1}$ $cm_{cat}^{-2}$ as the catalyst has a low BET surface area of ~2.0 $m^2$ $g^{-1}$, which is orders of magnitude higher than the typical existing catalysts. The production rate could be further enhanced by advanced materials synthesis for nanoscale $Fe_2Mo_6S_8$, and therefore could provide some new insights on the design principles of selective catalysts for $N_2$ to $NH_3$ conversion.

Conclusion

In summary, we describe outstanding activities of the Iron-containing Chevrel phase chalcogenides, such as $Fe_2Mo_6S_8$, for highly selective electrochemical conversion of $N_2$ to $NH_3$ under ambient condition. The activities arise from the unique structure of these materials, which provides true multi-active binding sites for separate binding and activating key precursor molecules, including the Fe/Mo-sites for activating $N_2$ and the S-site for binding with H and inhibiting the undesired HER. The geometry of Fe, Mo and S spatially confines these intermediates to ensure facile hydrogenation of $*N_2$ for promoted $NH_3$ formation, reaching a high $NH_3$ production rate of 70 μg $h^{-1}$ $mg_{cat}^{-1}$ that translate into a remarkable surface area normalized rate of 3.5 μg $h^{-1}$ $cm_{cat}^{-2}$. The observation of outstanding activity with low surface area $Fe_2Mo_6S_8$ catalysts is surprising, and suggests the catalyst is intrinsically active for $N_2$ conversion.

Example 2: Nitrogen Reduction to Ammonia on $Fe_4Mo_6S_8$

Figure 32:
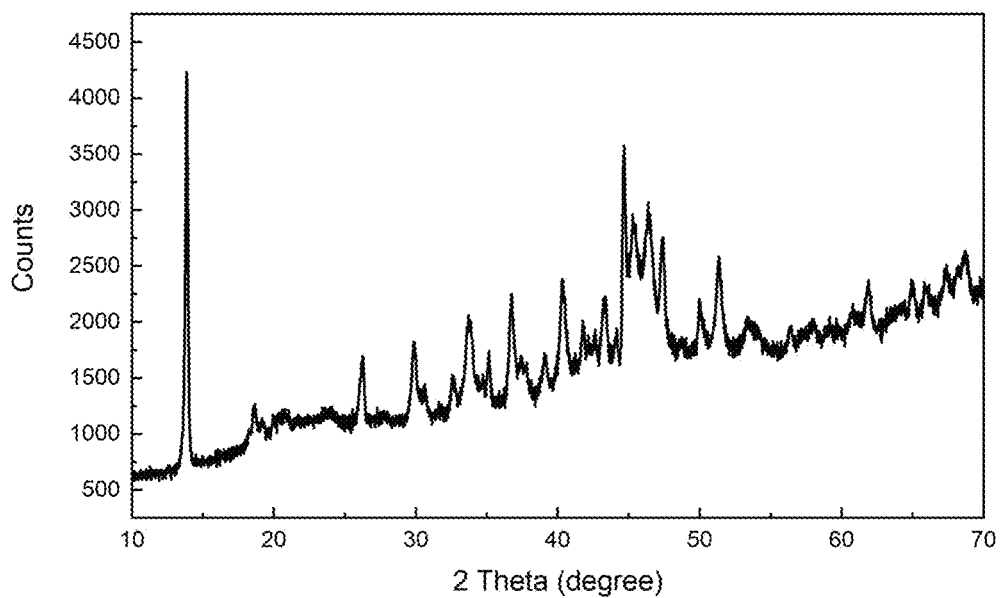
FIG. 32 is the X-ray powder diffraction pattern of $Fe_4Mo_6S_8$.
Figure 33:
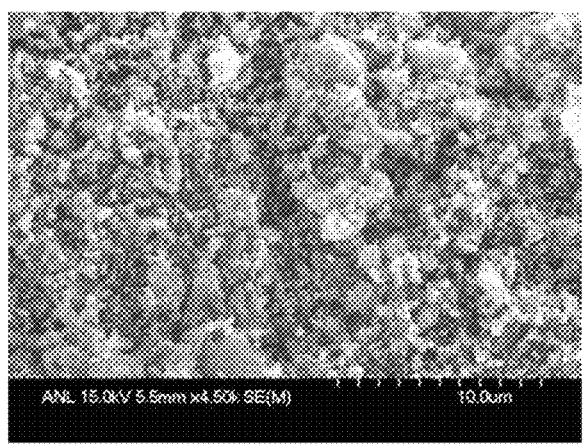
FIG. 33 and FIG. 34 are SEM images of $Fe_4Mo_6S_8$.
Figure 34:
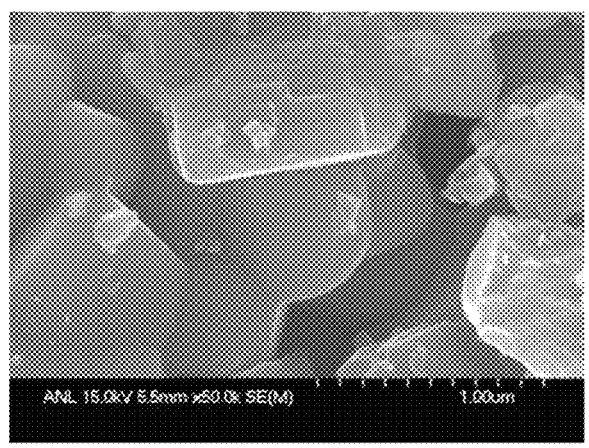

Synthesis:

Phase pure $Fe_4Mo_6S_8$ catalysts were synthesized using a two-step method. First, FeS, Mo and $MoS_2$ powders with the molar ratio of 2:2:1 (typically 1.76 g FeS, 1.92 g Mo and 1.5 g $MoS_2$) were loaded in a ball-milling container inside an Ar-filled glove box and were milled for 9 hours using a high-energy mechanical miller. The milled mixture was collected and transferred to a tube furnace and calcined under Ar at 1000° C. for 10 hours, which resulted in formation of nearly pure $Fe_4Mo_6S_8$ powders. The X-ray powder diffraction pattern of $Fe_4Mo_6S_8$ is shown in FIG. 32, and SEM images are shown in FIG. 33 and FIG. 34. $Fe_xMo_6S_8$, where x=1 and 6 were prepared in a similar fashion, but some impurities were present in the product.

Figure 35:
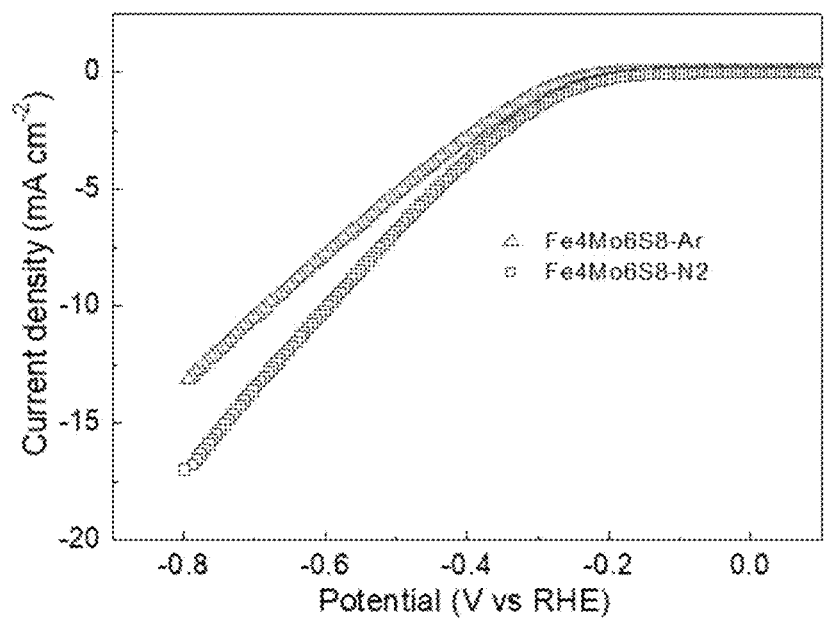
FIG. 35 is a plot of the linear sweep voltammetry of $Fe_4Mo_6S_8$ in Ar and $N_2$ saturated electrolytes.
Figure 36:
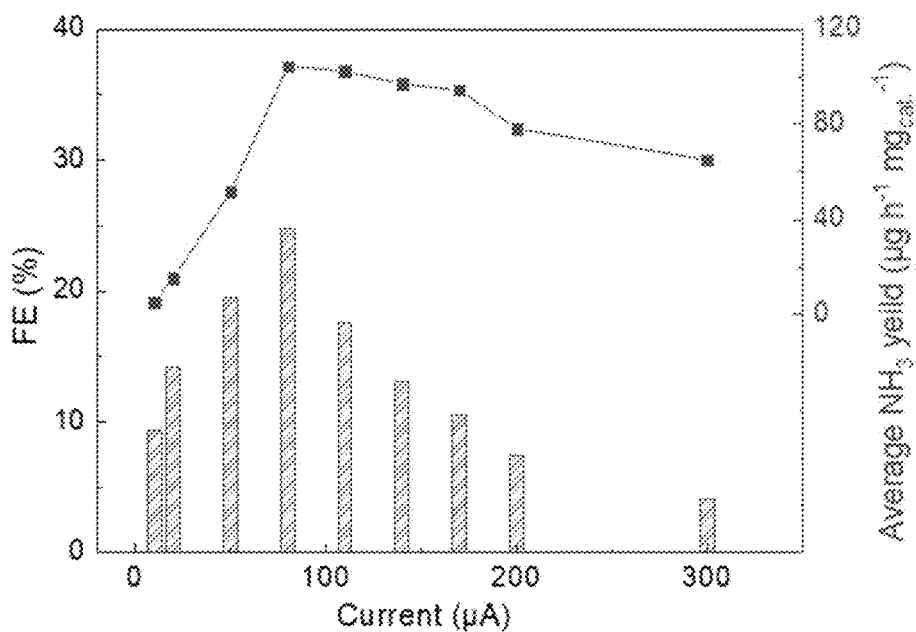
FIG. 36 illustrates a comparison of Faradaic efficiencies for ammonia production and average ammonia yield of $Fe_4Mo_6S_8$ at different applied currents.
Figure 37:
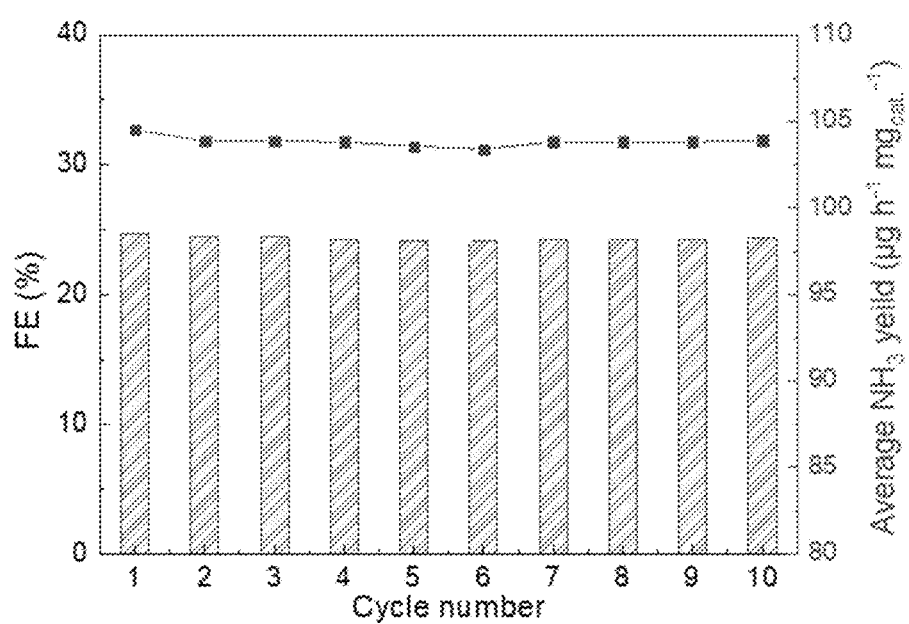
FIG. 37 illustrates a comparison of Faradaic efficiencies for ammonia production and average ammonia yield of $Fe_4Mo_6S_8$ as observed within 10 cycles.

$Fe_4Mo_6S_8$ was tested as a catalyst for the nitrogen reduction of ammonia, using the same testing protocols as described in Example 1. Linear sweep voltammetry (LSV) of $Fe_4Mo_6S_8$ in Ar and $N_2$ saturated electrolytes are shown in FIG. 35. The larger cathodic reduction current suggests Faradaic reactions associated with nitrogen. Comparison of Faradaic efficiencies for ammonia production and average ammonia yield at different applied currents is shown in FIG. 36. The highest Faradaic efficiency was 25% and the highest ammonia yield was ~102 μg $h^{-1}$ $mg_{cat}^{-1}$. The $Fe_4Mo_6S_8$ catalyst has good stability for continuous production of ammonia. No appreciable decay in Faradaic efficiency and average ammonia yield was observed within 10 cycles, as shown in FIG. 37.

REFERENCES

1. Erisman, J. W.; Sutton, M. A.; Galloway, J.; Klimont, Z.; Winiwarter, W., How a century of ammonia synthesis changed the world. *Nat Geosci* 2008, 1 (10), 636-639.
2. Guo, J.; Chen, P., Catalyst: $NH_3$ as an Energy Carrier. *Chem* 2017, 3 (5), 709-712.
3. Wang, L.; Xia, M.; Wang, H.; Huang, K.; Qian, C.; Maravelias, C. T.; Ozin, G. A., Greening Ammonia toward the Solar Ammonia Refinery. *Joule* 2018, 2 (6), 1055-1074.
4. Kandemir, T.; Schuster, M. E.; Senyshyn, A.; Behrens, M.; Schlögl, R., The Haber-Bosch Process Revisited: On the Real Structure and Stability of "Ammonia Iron" under Working Conditions. *Angewandte Chemie International Edition* 2013, 52 (48), 12723-12726.
5. Soloveichik, G., Electrochemical synthesis of ammonia as a potential alternative to the Haber-Bosch process. *Nat Catal* 2019, 2 (5), 377-380.
6. Smith, C.; Hill, A. K.; Torrente-Murciano, L., Current and future role of Haber-Bosch ammonia in a carbon-free energy landscape. *Energy & Environmental Science* 2020, 13 (2), 331-344.
7. Zheng, J.; Lyu, Y.; Qiao, M.; Wang, R.; Zhou, Y.; Li, H.; Chen, C.; Li, Y.; Zhou, H.; Jiang, S. P.; Wang, S., Photoelectrochemical Synthesis of Ammonia on the Aerophilic-Hydrophilic Heterostructure with 37.8% Efficiency. *Chem* 2019, 5 (3), 617-633.
8. Lazouski, N.; Schiffer, Z. J.; Williams, K.; Manthiram, K., Understanding Continuous Lithium-Mediated Electrochemical Nitrogen Reduction. *Joule* 2019, 3 (4), 1127-1139.
9. Foster, S. L.; Bakovic, S. I. P.; Duda, R. D.; Maheshwari, S.; Milton, R. D.; Minteer, S. D.; Janik, M. J.; Renner, J. N.; Greenlee, L. F., Catalysts for nitrogen reduction to ammonia. *Nat Catal* 2018, 1 (7), 490-500.
10. Rosca, V.; Duca, M.; de Groot, M. T.; Koper, M. T. M., Nitrogen Cycle Electrocatalysis. *Chemical Reviews* 2009, 109 (6), 2209-2244.
11. Hu, L.; Xing, Z.; Feng, X. F., Understanding the Electrocatalytic Interface for Ambient Ammonia Synthesis. *Acs Energy Letters* 2020, 5 (2), 430-436.

12. Singh, A. R.; Rohr, B. A.; Statt, M. J.; Schwalbe, J. A.; Cargnello, M.; Nørskov, J. K., Strategies toward Selective Electrochemical Ammonia Synthesis. *ACS Catalysis* 2019, 9 (9), 8316-8324.

13. Hawtof, R.; Ghosh, S.; Guarr, E.; Xu, C.; Mohan Sankaran, R.; Renner, J. N., Catalyst-free, highly selective synthesis of ammonia from nitrogen and water by a plasma electrolytic system. *Sci Adv* 2019, 5 (1), eaat5778.

14. Hu, L.; Khaniya, A.; Wang, J.; Chen, G.; Kaden, W. E.; Feng, X., Ambient Electrochemical Ammonia Synthesis with High Selectivity on Fe/Fe Oxide Catalyst. *ACS Catalysis* 2018, 8 (10), 9312-9319.

15. Wang, J.; Yu, L.; Hu, L.; Chen, G.; Xin, H.; Feng, X., Ambient ammonia synthesis via palladium-catalyzed electrohydrogenation of dinitrogen at low overpotential. *Nat Commun* 2018, 9 (1), 1795.

16. Li, L.; Tang, C.; Xia, B.; Jin, H.; Zheng, Y.; Qiao, S.-Z., Two-Dimensional Mosaic Bismuth Nanosheets for Highly Selective Ambient Electrocatalytic Nitrogen Reduction. *ACS Catalysis* 2019, 9 (4), 2902-2908.

17. Patil, S. B.; Chou, H.-L.; Chen, Y.-M.; Hsieh, S.-H.; Chen, C.-H.; Chang, C.-C.; Li, S.-R.; Lee, Y.-C.; Lin, Y.-S.; Li, H.; Chang, Y. J.; Lai, Y.-H.; Wang, D.-Y., Enhanced $N_2$ affinity of 1T-$MoS_2$ with a unique pseudo-six-membered ring consisting of N—Li—S—Mo—S—Mo for high ambient ammonia electrosynthesis performance. *Journal of Materials Chemistry A* 2021.

18. Tao, H.; Choi, C.; Ding, L.-X.; Jiang, Z.; Han, Z.; Jia, M.; Fan, Q.; Gao, Y.; Wang, H.; Robertson, A. W.; Hong, S.; Jung, Y.; Liu, S.; Sun, Z., Nitrogen Fixation by Ru Single-Atom Electrocatalytic Reduction. *Chem* 2019, 5 (1), 204-214.

19. Pang, F.; Wang, Z.; Zhang, K.; He, J.; Zhang, W.; Guo, C.; Ding, Y., Bimodal nanoporous $Pd_3Cu_1$ alloy with restrained hydrogen evolution for stable and high yield electrochemical nitrogen reduction. *Nano Energy* 2019, 58, 834-841.

20. Han, L.; Liu, X.; Chen, J.; Lin, R.; Liu, H.; Lu, F.; Bak, S.; Liang, Z.; Zhao, S.; Stavitski, E.; Luo, J.; Adzic, R. R.; Xin, H. L., Atomically Dispersed Molybdenum Catalysts for Efficient Ambient Nitrogen Fixation. *Angew Chem Int Ed Engl* 2019, 58 (8), 2321-2325.

21. Deng, J.; Iñiguez, J. A.; Liu, C., Electrocatalytic Nitrogen Reduction at Low Temperature. *Joule* 2018, 2 (5), 846-856.

22. Zhang, L.; Ji, X.; Ren, X.; Ma, Y.; Shi, X.; Tian, Z.; Asiri, A. M.; Chen, L.; Tang, B.; Sun, X., Electrochemical Ammonia Synthesis via Nitrogen Reduction Reaction on a $MoS_2$ Catalyst: Theoretical and Experimental Studies. *Adv Mater* 2018, 30 (28), e1800191.

23. Cheng, H.; Ding, L. X.; Chen, G. F.; Zhang, L.; Xue, J.; Wang, H., Molybdenum Carbide Nanodots Enable Efficient Electrocatalytic Nitrogen Fixation under Ambient Conditions. *Adv Mater* 2018, 30 (46), e1803694.

24. Chen, G. F.; Cao, X.; Wu, S.; Zeng, X.; Ding, L. X.; Zhu, M.; Wang, H., Ammonia Electrosynthesis with High Selectivity under Ambient Conditions via a Li(+) Incorporation Strategy. *J Am Chem Soc* 2017, 139 (29), 9771-9774.

25. Bao, D.; Zhang, Q.; Meng, F. L.; Zhong, H. X.; Shi, M. M.; Zhang, Y.; Yan, J. M.; Jiang, Q.; Zhang, X. B., Electrochemical Reduction of $N_2$ under Ambient Conditions for Artificial $N_2$ Fixation and Renewable Energy Storage Using $N_2/NH_3$ Cycle. *Adv Mater* 2017, 29 (3).

26. Singh, A. R.; Rohr, B. A.; Schwalbe, J. A.; Cargnello, M.; Chan, K.; Jaramillo, T. F.; Chorkendorff, I.; Nørskov, J. K., Electrochemical Ammonia Synthesis—The Selectivity Challenge. *ACS Catalysis* 2017, 7 (1), 706-709.

27. Lu, K.; Liu, Y.; Lin, F.; Cordova, I. A.; Gao, S.; Li, B.; Peng, B.; Xu, H.; Kaelin, J.; Coliz, D.; Wang, C.; Shao, Y.; Cheng, Y., $Li_xNiO/Ni$ Heterostructure with Strong Basic Lattice Oxygen Enables Electrocatalytic Hydrogen Evolution with Pt-like Activity. *Journal of the American Chemical Society* 2020, 142 (29), 12613-12619.

28. Suryanto, B. H. R.; Wang, D.; Azofra, L. M.; Harb, M.; Cavallo, L.; Jalili, R.; Mitchell, D. R. G.; Chatti, M.; MacFarlane, D. R., $MoS_2$ Polymorphic Engineering Enhances Selectivity in the Electrochemical Reduction of Nitrogen to Ammonia. *ACS Energy Letters* 2018, 4 (2), 430-435.

29. Burgess, B. K.; Lowe, D. J., Mechanism of Molybdenum Nitrogenase. *Chem Rev* 1996, 96 (7), 2983-3012.

30. Buscagan, T. M.; Rees, D. C., Rethinking the Nitrogenase Mechanism: Activating the Active Site. *Joule* 2019, 3 (11), 2662-2678.

31. Banerjee, A.; Yuhas, B. D.; Margulies, E. A.; Zhang, Y.; Shim, Y.; Wasielewski, M. R.; Kanatzidis, M. G., Photochemical nitrogen conversion to ammonia in ambient conditions with FeMoS-chalcogels. *J Am Chem Soc* 2015, 137 (5), 2030-4.

32. Mao, M.; Lin, Z.; Tong, Y.; Yue, J.; Zhao, C.; Lu, J.; Zhang, Q.; Gu, L.; Suo, L.; Hu, Y.-S.; Li, H.; Huang, X.; Chen, L., Iodine Vapor Transport-Triggered Preferential Growth of Chevrel $Mo_6S_8$ Nanosheets for Advanced Multivalent Batteries. *ACS Nano* 2020, 14 (1), 1102-1110.

33. Levi, E.; Gershinsky, G.; Aurbach, D.; Isnard, O., Crystallography of Chevrel phases, $MMo_6T_8$ (M=Cd, Na, Mn, and Zn, T=S, Se) and their cation mobility. *Inorg Chem* 2009, 48 (18), 8751-8.

34. Liu, M.; Hybertsen, M. S.; Wu, Q., A Physical Model for Understanding the Activation of $MoS_2$ Basal-Plane Sulfur Atoms for the Hydrogen Evolution Reaction. *Angewandte Chemie International Edition* 2020, 59 (35), 14835-14841.

35. Lu, K.; Gao, S.; Li, G.; Kaelin, J.; Zhang, Z.; Cheng, Y., Regulating Interfacial Na-Ion Flux via Artificial Layers with Fast Ionic Conductivity for Stable and High-Rate Na Metal Batteries. *ACS Materials Letters* 2019, 1 (3), 303-309.

36. Sheng, H.; Hermes, E. D.; Yang, X.; Ying, D.; Janes, A. N.; Li, W.; Schmidt, J. R.; Jin, S., Electrocatalytic Production of $H_2O_2$ by Selective Oxygen Reduction Using Earth-Abundant Cobalt Pyrite ($CoS_2$). *ACS Catalysis* 2019, 9 (9), 8433-8442.

37. Zhang, H. T.; Liu, C.; Liu, P.; Hu, Y. H., $Mo_6S_8$-based single-metal-atom catalysts for direct methane to methanol conversion. *J Chem Phys* 2019, 151 (2), 024304.

38. Bolleter, W. T.; Bushman, C. J.; Tidwell, P. W., Spectrophotometric Determination of Ammonia as Indophenol. *Anal. Chem.* 1961, 33, 592-594.

39. Zhao, S.; Lu, X.; Wang, L.; Gale, J.; Amal, R., Carbon-Based Metal-Free Catalysts for Electrocatalytic Reduction of Nitrogen for Synthesis of Ammonia at Ambient Conditions. *Adv Mater* 2019, 31(13), e1805367.

40. Andersen, S. Z.; Colic, V.; Yang, S.; Schwalbe, J. A.; Nielander, A. C.; McEnaney, J. M.; Enemark-Rasmussen, K.; Baker, J. G.; Singh, A. R.; Rohr, B. A.; Staff, M. J.; Blair, S. J.; Mezzavilla, S.; Kibsgaard, J.; Vesborg, P. C. K.; Cargnello, M.; Bent, S. F.; Jaramillo, T. F.; Stephens, I. E. L.; Norskov, J. K.; Chorkendorff, I., A rigorous electrochemical ammonia synthesis protocol with quantitative isotope measurements. *Nature* 2019, 570 (7762), 504-508.

41. Hu, B.; Hu, M.; Seefeldt, L.; Liu, T. L., Electrochemical Dinitrogen Reduction to Ammonia by Mo$_2$N: Catalysis or Decomposition? *ACS Energy Letters* 2019, 4 (5), 1053-1054.
42. Watt, G. W.; Chrisp, J. D., Spectrophotometric Method for Determination of Hydrazine. *Anal Chem* 1952, 24 (12), 2006-2008.
43. Liu, C.; Liu, P., Mechanistic Study of Methanol Synthesis from CO$_2$ and H$_2$ on a Modified Model Mo$_6$S$_8$ Cluster. *ACS Catalysis* 2015, 5 (2), 1004-1012.
44. Holmgren, D. J.; Demers, R. T.; Klein, M. V.; Ginsberg, D. M., Raman study of phonons in Chevrel-phase crystals. *Physical Review B* 1987, 36 (4), 1952-1955.
45. Gallenkamp, C.; Kramm, U. I.; Proppe, J.; Krewald, V., Calibration of computational Mössbauer spectroscopy to unravel active sites in FeNC catalysts for the oxygen reduction reaction. *International Journal of Quantum Chemistry* 2021, 121 (3), e26394.
46. Marcus, H. L.; Schwartz, L. H., Mossbauer Spectra of FeMo Alloys. *Physical Review* 1967, 162 (2), 259-262.
47. Lu, K.; Gao, S.; Dick, R. J.; Sattar, Z.; Cheng, Y. *Journal of Materials Chemistry A* 2019, 7, (11), 6038-6044.
48. Xie, X.; Song, M.; Wang, L.; Engelhard, M. H.; Luo, L.; Miller, A.; Zhang, Y.; Du, L.; Pan, H.; Nie, Z.; Chu, Y.; Estevez, L.; Wei, Z.; Liu, H.; Wang, C.; Li, D.; Shao, Y. *ACS Catalysis* 2019, 9, (9), 8712-8718.
49. Song, Y.; Peng, R.; Hensley, D. K.; Bonnesen, P. V.; Liang, L.; Wu, Z.; Meyer III, H. M.; Chi, M.; Ma, C.; Sumpter, B. G.; Rondinone, A. J. *ChemistrySelect* 2016, 1, (19), 6055-6061.
50. Zhu, D.; Zhang, L.; Ruther, R. E.; Hamers, R. J. *Nature Materials* 2013, 12, (9), 836-841.
51. Watt, G. W.; Chrisp, J. D. *Analytical Chemistry* 1952, 24, (12), 2006-2008.
52. Wang, M.; Liu, S.; Qian, T.; Liu, J.; Zhou, J.; Ji, H.; Xiong, J.; Zhong, J.; Yan, C. *Nat Commun* 2019, 10, (1), 341.
53. Gallenkamp, C.; Kramm, U. I.; Proppe, J.; Krewald, V. *International Journal of Quantum Chemistry* 2021, 121, (3), e26394.
54. Marcus, H. L.; Schwartz, L. H. *Physical Review* 1967, 162, (2), 259-262.
55. Duan, G.; Chen, Y.; Tang, Y.; Gasem, K. A. M.; Wan, P.; Ding, D.; Fan, M. Advances in electrocatalytic ammonia synthesis under mild conditions. *Progress in Energy and Combustion Science* 2020, 81, (100860), 1-30.
56. Yongjun Leng, Guang Chen, Alfonso J. Mendoza, Timothy B. Tighe, Michael A. Hickner, and Chao-Yang Wang. Solid-State Water Electrolysis with an Alkaline Membrane. *Journal of the American Chemical Society* 2012 134 (22), 9054-9057.

What is claimed is:

1. An iron-containing Chevrel phase material, containing iron and Mo$_6$S$_8$ clusters, having a ratio, x, of iron to Mo$_6$S$_8$ cluster of x=4.

2. The iron-containing Chevrel phase material of claim 1, having a formula Fe$_4$Mo$_6$S$_8$.

3. An electrode, comprising:
    (1) a conductive substrate, and
    (2) the iron-containing Chevrel phase material of claim 1, on the conductive substrate.

4. The electrode of claim 3, wherein the iron-containing Chevrel phase material has a formula Fe$_4$Mo$_6$S$_8$.

5. The electrode of claim 3, wherein the conductive substrate comprises carbon.

6. A system for producing ammonia electrochemically from N$_2$ and water, comprising:
    (a) a working electrode, comprising
       (1) a conductive substrate, and
       (2) an iron-containing Chevrel phase material, on the conductive substrate,
    (b) a counter electrode, and
    (c) an ion-conductive separator between the working electrode and the counter electrode,
    wherein the iron-containing Chevrel phase material contains iron and Mo$_6$S$_8$ clusters, having a ratio, x, of iron to Mo$_6$S$_8$ cluster of x=4.

7. The system of claim 6, further comprising a container, wherein the container comprises:
    (i) a cathode compartment, with the working electrode in the cathode compartment, and
    (ii) an anode compartment, with the counter electrode in the anode compartment,
    wherein the cathode compartment and the anode compartment are separated by the ion-conductive separator.

8. The system of claim 7, further comprising:
    a cathode electrolyte solution in the cathode compartment, in contact with the working electrode, and
    an anode electrolyte solution in the anode compartment, in contact with the counter electrode.

9. A facility for manufacturing ammonia, comprising:
    (A) the system of claim 8,
    (B) a power source,
    (C) a water feed, and
    (D) an ammonia dispense.

10. A method of producing ammonia electrochemically from N$_2$ and water, with the system of claim 8, comprising:
    passing electricity through the working electrode and the counter electrode to produce ammonia from N$_2$ and water.

11. The method of claim 10, having a Faradaic efficiency of at least 12%.

12. The method, of claim 10, having a mass-normalized yield rate of at least 50 μg/h per mg of catalyst.

13. A method of producing ammonia electrochemically from N$_2$ and water, with the facility of claim 9, comprising:
    passing electricity through the working electrode and the counter electrode, to produce ammonia from N$_2$ and water.

* * * * *

UNITED STATES PATENT AND TRADEMARK OFFICE
CERTIFICATE OF CORRECTION

| | | |
|---|---|---|
| PATENT NO. | : 11,846,033 B2 | Page 1 of 1 |
| APPLICATION NO. | : 17/323185 | |
| DATED | : December 19, 2023 | |
| INVENTOR(S) | : Yingwen Cheng et al. | |

It is certified that error appears in the above-identified patent and that said Letters Patent is hereby corrected as shown below:

In the Claims

Column 17, Line 55, please delete "$Mo_6S_8$, clusters, having a ratio, x, of iron to $Mo_6S_8$," and insert --$Mo_6S_8$ clusters, having a ratio, x, of iron to $Mo_6S_8$--

Column 18, Line 40, please delete "dispense." and insert --dispenser.--

Column 18, Line 44, please delete "electrode" and insert --electrode,--

Signed and Sealed this
Twenty-seventh Day of February, 2024

*Katherine Kelly Vidal*

Katherine Kelly Vidal
*Director of the United States Patent and Trademark Office*